(12) United States Patent
Siddiqui et al.

(10) Patent No.: US 7,630,741 B2
(45) Date of Patent: Dec. 8, 2009

(54) COMPACT AND DURABLE MESSENGER DEVICE

(75) Inventors: Kabir Siddiqui, Sammamish, WA (US); David W. Voth, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 412 days.

(21) Appl. No.: 11/318,377

(22) Filed: Dec. 23, 2005

(65) Prior Publication Data

US 2007/0013666 A1 Jan. 18, 2007

Related U.S. Application Data

(60) Provisional application No. 60/698,662, filed on Jul. 12, 2005.

(51) Int. Cl.
*H04M 1/00* (2006.01)

(52) U.S. Cl. ............... 455/575.1; 455/566; 455/556.1; 345/173

(58) Field of Classification Search ........... 455/550, 455/575.1, 566, 550.1, 575.3; 379/433.01, 379/433.13, 433.07, 368
See application file for complete search history.

(56) References Cited

U.S. PATENT DOCUMENTS

| | | | |
|---|---|---|---|
| 6,044,152 A * | 3/2000 | Mendolia | 379/433.07 |
| 6,230,269 B1 | 5/2001 | Spies et al. | |
| 6,662,300 B1 | 12/2003 | Peters | |
| 6,754,507 B2 * | 6/2004 | Takagi | 455/550.1 |
| 6,845,380 B2 | 1/2005 | Su et al. | |
| 6,848,078 B1 | 1/2005 | Birsan et al. | |
| 6,925,313 B2 * | 8/2005 | Kweon et al. | 455/566 |
| 2003/0023876 A1 | 1/2003 | Bardsley et al. | |
| 2003/0025668 A1 | 2/2003 | Lin | |
| 2003/0163737 A1 | 8/2003 | Roskind | |
| 2003/0204481 A1 | 10/2003 | Lau | |
| 2004/0060007 A1 | 3/2004 | Gottlob et al. | |
| 2004/0128296 A1 | 7/2004 | Krishnamurthy et al. | |
| 2004/0143581 A1 | 7/2004 | Bohannon et al. | |
| 2004/0158714 A1 | 8/2004 | Peyravian | |
| 2004/0261018 A1 | 12/2004 | Dunne et al. | |
| 2005/0022020 A1 | 1/2005 | Fremberg | |
| 2005/0041009 A1 * | 2/2005 | Kuroda | 345/102 |

(Continued)

FOREIGN PATENT DOCUMENTS

JP 14-073553 A 3/2002

OTHER PUBLICATIONS

Netcraft, "Netcraft Toolbar Help Pages FAQ," 2004, available at: http://toolbar.netcraft.com/help/faq/index.html.

(Continued)

*Primary Examiner*—Rafael Pérez-Gutiérrez
*Assistant Examiner*—Joseph Arevalo
(74) *Attorney, Agent, or Firm*—Woodcock Washburn LLP

(57) ABSTRACT

The subject innovation and/or methods relate to a compact durable communication device that can include a plurality of improvements to provide durability and thinness. The devices can be a clamshell smartphone, a messenger device, a thin smartphone, and/or any other suitable mobile communication device. The improvements can include a magnesium plate, an opening for an electrical component associated with the plate, internal antenna placement, an extended backlight for a dual display, and/or a mono hinge to provide connectivity.

15 Claims, 24 Drawing Sheets

804 – QWERTY Keyboard
808 – Magnesium Plate
810 – PCB
814 – Lower back case
816 – Battery Pack
708 – Joint
710 - USB
714 – Audio Input

U.S. PATENT DOCUMENTS

| | | | |
|---|---|---|---|
| 2005/0049017 A1* | 3/2005 | Yoda | 455/575.1 |
| 2005/0068913 A1 | 3/2005 | Tan et al. | |
| 2005/0087769 A1* | 4/2005 | Yamazaki et al. | 257/202 |
| 2005/0108567 A1 | 5/2005 | D'Souza et al. | |
| 2005/0127820 A1* | 6/2005 | Yamazaki et al. | 313/501 |
| 2005/0177578 A1 | 8/2005 | Chen | |
| 2005/0179850 A1 | 8/2005 | Du | |
| 2005/0182778 A1 | 8/2005 | Heuer et al. | |
| 2005/0192990 A1 | 9/2005 | Kharitidi et al. | |
| 2005/0229097 A1 | 10/2005 | Lander | |
| 2005/0235358 A1 | 10/2005 | Keohane et al. | |
| 2006/0216469 A1 | 9/2006 | Hashizume | |
| 2006/0232495 A1* | 10/2006 | Chang et al. | 345/1.1 |
| 2006/0250312 A1 | 11/2006 | Kobayashi | |
| 2007/0005984 A1 | 1/2007 | Florencio et al. | |
| 2007/0006305 A1 | 1/2007 | Florencio et al. | |
| 2007/0199054 A1 | 8/2007 | Florencio et al. | |
| 2008/0015002 A1 | 1/2008 | Crisp | |

OTHER PUBLICATIONS

Boneh, et al., "Defending Against Online Identity Theft and Phishing," presentation given at Proceedings: United States—Japan Critical Information Infrastructure Protection Workshop, Sep. 2004, available at: http://www2.gwu.edu/~usjpciip/BonehD.pdf.

Boneh, et al., "Web Password Hashing," 3 pages, last accessed Jun. 28, 2005, available at: http://crypto.stanford.edu/PwdHash/.

International Search Report dated Oct. 24, 2007 for PCT Application Serial No. PCT/US2007/004044, 3 Pages.

Adida, B. et al., "Fighting Phishing Attacks: A Lightweight Trust Architecture for Detecting Spoofed Emails," in Proceedings of DIMACS Workshop on Theft in E-Commerce: Content, Identity, and Service, Piscataway, New Jersey, Apr. 2005, 16 pages.

Adida, B. et al., "Separable Identity-based Ring Signatures: Theoretical Foundations for Fighting Phishing Attacks," in Proceedings of DIMACS Workshop on Theft in E-Commerce: Content, Identity, and Service, Piscataway, New Jersey, Feb. 28, 2005, 18 pages.

Chou, N. et al., "Client-Side Defense Against Web-Based Identity Theft," in Proceedings of 11th Annual Network and Distributed System Security Symposium (NDSS '04), San Diego, Feb. 2004, 16 pages.

Delany, M., "Domain-Based Email Authentication Using Public-Keys Advertised in the DNS (DomainKeys)," Internet Draft available at: http://www.ietf.org/internet-drafts/draft-delany-domainkeys-base-03.txt, Sep. 29, 2005, last checked Feb. 24, 2006, 40 pages.

Florencio, D. and Herley, C., "Stopping a Phishing Attack, Even When the Victims Ignore Warnings," Microsoft Research Technical Report, Oct. 2005. Available at: http://research.microsoft.com/research/pubs/view.aspx?type=Publication&id=1489, last accessed Feb. 24, 2006.

Gabber, E. et al., "How to Make Personalized Web Browsing Simple, Secure, and Anonymous," Financial Cryptography, 1997, pp. 17-32.

Halderman, J.A. et al., "A Convenient Method for Securely Managing Passwords," in Proceedings of the 14th International World Wide Web Conference (WWW 2005), Chiba, Japan, May 10-14, 2005, 9 pages.

Jakobsson, M. and Young, A., "Distributed Phishing Attacks," in Proceedings of DIMACS Workshop on Theft in E-Commerce: Content, Identity, and Service, Piscataway, New Jersey, Apr. 2005, 10 pages.

Kelsey, J. et al., "Secure Applications of Low-Entropy Keys," Lecture Notes in Computer Science, 1997, vol. 1396, pp. 121-134.

Oechslin, P., "Making a Faster Cryptanalytical Time-Memory Trade-Off," in Proceedings of Advances in Cryptology—CRYPTO 2003, 23rd Annual International Cryptology Conference, Santa Barbara, California, Aug. 17-21, 2003, 15 pages.

Ross, B. et al., "A Browser Plug-In Solution to the Unique Password Problem," in Proceedings of the 14th USENIX Security Symposium, Technical Report Stanford-SecLab-TR-2005-1, 2005, 15 pages.

Sahami, M. et al., "A Bayesian Approach to Filtering Junk Email," in AAAI '98 Workshop on Learning for Text Categorization, Jul. 1998, 8 pages.

http://www.passport.com, links directly to: https://accountservices.passport.net/ppnetworkhome.srf?vv=330&lc=1033, last accessed Feb. 28, 2006.

http://www.spoofstick.com, last accessed Feb. 28, 2006.

Anti-Phishing Working Group, at http://www.antiphishing.org, last accessed Feb. 28, 2006.

"Bloom Filter" http://www.nist.gov/dads/HTML/bloomFilter.html last viewed, Jan. 27, 2006, 1 page.

"Earthlink Toolbar Featuring ScamBlocker for Windows Users" http://www/earthlink.net/software/free/toolbar/, last accessed Mar. 7, 2006, 2 pages.

Ross, et al. "Stronger Password Authentication Using Browser Extensions" (2005) Proceedings of the 14th Usenix Security Symposium 15 pages.

"James F. Power, et al., A metrics suite for grammar-based software, Journal of Software Maintenance and Evolution: Research and Practice, 2004. http://www.cs.nuim.ie/~jpower/Research/Papers/2004/jsme04.pdf".

Luc Segoufin, Typing and Querying XML Documents: Some Complexity Bounds. http://delivery.acm.org/10.1145/780000/773170/p167-segoufin.pdf?key1=773170&key2=7019847311&coll=GUIDE&dl=GUIDE&CFID=65860176&CFTOKEN=65663645.

Mustafa H. Qureshi, et al., Determining the Complexity of XML Documents. http://doi.ieeecomputersociety.org/10.1109/ITCC.2005.126.

Ralf Lammel, et al., Analysis of XML schema usage http://homepages.cwi.nl/~ralf/xml05/html/paper.htm.

Thomas J. McCabe, A complexity measure. http://portal.acm.org/citation.cfm?id=807712&coll=GUIDE&dl=GUIDE&CFID=62736624&CFTOKEN=661444&ret=1#Fulltext.

* cited by examiner

302 – Rubber Plunger sheet
304 – Openings for switch plungers
306 – Opening(s) for LED
208 – Antenna
212 – PCB
214 – Support Plate 500 – Lower portion of Clamshell Phone
502 – Audio Input
210 – Battery
206 – PCB
208 - Antenna 606 – Open Messenger device
614 – Data Input Pad
616 – Joint
610 – Lower Portion
612 – Main Display
608 – Non Display Area
600 – Closed Messenger device
602 – External Display
604 – Keypad 700 – Back Panel view
702 – Antenna
704 – Camera
706 – Radio
708 – Joint
710 - USB
712 – SIM card
714 – Audio Input 804 – QWERTY Keyboard
808 – Magnesium Plate
810 – PCB
814 – Lower back case
816 – Battery Pack
708 – Joint
710 - USB
714 – Audio Input 1000 – Lower portion
1002 – Keypad
1004 – Magnesium chassis
1006 – Back cover
810 – PCB
816 – Battery Pack 1100 – Lower portion
1102 – Battery Pocket
1002 – Keypad
1004 – Magnesium chassis
1006 – Back cover
810 – PCB
816 – Battery Pack 1200 – Upper Portion
1202 – Lens
1204 – Upper front case
1206 – Keypad
1208 – Dual Display
1210 – Flex PCB
1212 – Speaker
1214 – Joint
1216 – Upper Inner Plate
1218 – Inner Lens 1306 – Second Side
1302 – Secondary Display
1208 – First Side
1300 – Main Display
1304 – Non Viewing area 1400 – Thin Smartphone
1402 – Display Screen
1404 - Input(s)

1500 — Thin Smartphone
1502 — Flex PCB
1504 — Support Chassis
1506 — Dome switch(s)
1508 — LEDs
1510 — Bent area
1402 - Display 1800 — Internal Clamshell phone
1802 — Display Screen
1804 — Mono Hinge
1806 — Upper portion
1808 — Flex Connector
1810 — Flex Cable
1812 — Flex PCB
1814 — Lower portion 1804 – Mono Hinge
1806 – Upper portion
1808 – Flex Connector
1810 – Flex Cable
1812 – Flex PCB
1902 – First coupling
1904 – Second coupling 1902 — First coupling
1904 — Second coupling
2002 — Display
2004 — Enlarged view of hinge
2006 — Upper portion
2008 — Flex connector
2010 — Flex Cable
2012 — Display
2014 — Lower Portion

COMPACT AND DURABLE MESSENGER DEVICE

CROSS REFERENCE TO RELATED APPLICATION(S)

This application claims the benefit of U.S. Provisional Patent Application Ser. No. 60/698,662 filed on Jul. 12, 2005, entitled "COMPACT AND DURABLE COMMUNICATION DEVICES." The entirety of this application is incorporated herein by reference. This application is related to U.S. patent application Ser. No. 11/317,767, filed Dec. 23, 2005, and entitled, "COMPACT AND DURABLE CLAMSHELL SMARTPHONE", U.S. patent application Ser. No. 11/318,378, filed Dec. 23, 2005, and entitled, "COMPACT AND DURABLE THIN SMARTPHONE", and, U.S. patent application Ser. No. 11/318,209, filed Dec. 23, 2005, and entitled, "MONO HINGE FOR COMMUNICATION DEVICE". The entireties of the aforementioned applications are hereby incorporated by reference.

BACKGROUND

In the not too distant past, mobile communication devices in general, and mobile telephones in particular, were luxury items only affordable to those with substantial income. Furthermore, these mobile communication devices were significant in size, rendering them inconvenient for extended portability based at least in part upon size (e.g., battery, housing, circuitry, etc.). For example, in contrast to today's mobile telephones (and other mobile communication devices), mobile telephones of the recent past could not be placed into a user's pocket and/or handbag without causing extreme discomfort. In other words, the benefit of mobile communications was diminished due to the inconvenient characteristics associated with such former mobile communication devices.

The development, refinement, and advancements in mobile communications have rapidly increased to allow convenient and efficient mobile communications and/or mobile communication devices, wherein such above-described deficiencies have been overcome. Mobile communication devices have added functionality (e.g., game applications, web access, storage capacity, address books, display size, ergonomics, battery life, capture/display images, capture/display video, text message, etc.), while also decreased in size (e.g., housing, circuitry, battery, etc.). More importantly, the costs of such mobile communication devices and mobile communication services have decreased rapidly due to various technological advancements within the industry.

Furthermore, the development and refinement of mobile communication devices continues to occur at an extremely rapid pace. Advancements in mobile communication devices are mostly based upon consumer demand. In order to fulfill consumer needs, the industry provides a plurality of devices (e.g., models of devices having various applications, and features). Smaller devices, game applications, web access, storage capacity, display size, ergonomics, phonebook storage, longer battery life, are a few examples that encourage the mobile communication device industry to improve upon existing technology.

Mobile devices are increasing in technological ability wherein mobile communication devices can provide a plurality of functionality within a limited device-space. Mobile communication devices can be, but not limited to, cell phones, PDA, pagers, tablets, messenger devices, hand-helds, pocket translators, bar code scanners, smart phones, scanners, . . . Although each device employs a specific function for a user, devices have been developing to allow overlapping functionality in order to appeal to consumer needs. In other words, mobile communication devices have incorporated a plurality of features and/or applications such that the devices have invaded one another's functionality. For example, cell phones can provide cellular service, phonebooks, calendars, games, voicemail, paging, web browsing, video capture, image capture, voice memos, voice recognition, etc.

Communication devices such as cell phones, text messengers, pagers and the like have become ubiquitous. Large numbers of people carry their cell phones and messengers with them constantly. These communication devices are tossed into purses and briefcases where they are bounced against notebooks, keys and other items. In addition, the sheer volume of use places stress upon the communication devices. The pressure from the user's fingers upon the keypad can be translated to a printed circuit board (PCB) in the interior of the device, damaging the PCB and causing device failure. Conventional communication devices include an antenna which projects from the devices and which may be easily bent or indeed broken off of the device.

Therefore, mobile communication devices such as the aforementioned devices described above need to be durable to withstand strain and stress from daily usage; as well as the bumps and shocks associated with being transported. At the same time, users prefer to carry less bulky devices. Therefore, a premium is placed upon compactness of the communication device, without sacrificing usability or durability.

SUMMARY

The following presents a simplified summary of one or more embodiments of an interactive multimedia playback system in order to provide a basic understanding of some aspects of such embodiments. This summary is not an extensive overview, and is intended to neither identify key or critical elements of the embodiments nor delineate the scope of such embodiments. Its sole purpose is to present some concepts of the described embodiments in a simplified form as a prelude to the more detailed description that is presented later.

The subject innovation relates to a compact durable communication device that can include a plurality of improvements to provide durability and thinness. The communication device can include a magnesium plate and/or chassis support to provide rigidness, durability, and protection, wherein such magnesium plate and/or chassis supports the keypad and protects the PCB from stress (e.g., caused by the impact of user's fingers on the keypad). Moreover, the communication device can include embedded electrical components (e.g., light emitting diodes (LEDs), dome switches, rubber plungers, etc.) to reduce thickness of the device. The subject innovation further relates to a communication device that provide enhanced antenna placement to facilitate reducing the thickness of the device, wherein the antenna can be internal, thereby preventing the antenna from being bent or broken off of the device. The compact durable communication device can include an extended backlight to be shared between at least two displays, wherein the displays are considered a dual display. The compact durable communication device may also include a novel mono hinge mechanism allowing the device to fold and/or move in at least a partially circular direction about an axis while providing physical and electrical connectivity.

In accordance with one aspect of the claimed subject matter, a clamshell smartphone with various hardware improvements to allow for a small, thin, and durable device. A magnesium plate can be included with the clamshell smartphone, wherein such composition of magnesium provides various improvements in comparison with conventional materials. The magnesium plate can provide durability, rigidness, and/or protection. For instance, the magnesium plate can be positioned between a keypad and a PCB to protect from pressure induced by pressing keys associated with the keypad such that the stress to the PCB is greatly reduced. Moreover, the magnesium plate and/or chassis can include at least one opening for an electrical component, wherein the opening provides the electrical component to fit within the magnesium plate and/or chassis reducing the height of device.

Furthermore, an internal antenna can be placed in optimal positions to provide compact and durable devices. The internal antenna can be placed at the base of a lower portion of the clamshell smartphone, perpendicular to the lower side thickness associated with the PCB. In addition, the internal antenna can be placed at the top of a lower portion of the clamshell smartphone, perpendicular to the top side thickness associated with the PCB. In addition, the internal antenna can be placed such that the length of the antenna can be across the width of the device to allow the thickness of the device to be minimized.

In accordance with another aspect of the claimed subject matter, a messenger device with various hardware improvements to allow for a small, thin, and durable device. A magnesium plate can be included with the messenger device. The plate constructed from magnesium provides at least the following benefits in comparison to conventional plastics and/or materials (e.g., plastics, rubber, latex, etc.) for communication devices: enhanced absorption of shock, reduced buckling upon pressure, increased rigidness, reduced twistability, lighter weight, and improved feel. By placing the plate between a keyboard and a PCB assembly, the plate protects the PCB assembly from pressure induced by pressing keys. In addition, the magnesium plate can include at least one opening for an electrical component, wherein the opening provides the electrical component to fit within the magnesium plate and/or chassis reducing the height of device. The messenger device can further include an internal antenna substantially similar to the internal antenna utilized with the clamshell smartphone.

Furthermore, the messenger device can include a dual display, wherein a first viewing area (e.g., a main display) and a second viewing area (e.g., a secondary display) can share a backlight. The first viewing area can be located on a first surface and the second viewing area can be located on a second surface opposite of the first surface. The backlight can be positioned in between the first viewing area and the second viewing area. Moreover, the backlight can be extended to an area not utilized by one of the viewing areas. In other words, the backlight can be extended into a portion in between the viewing area beyond the active area associated with at least one of the viewing areas.

In accordance with another aspect of the innovation described herein, a thin smartphone with various hardware improvements to allow for a compact and durable device. A magnesium plate can be included with the thin smartphone, wherein such composition of magnesium provides various improvements in comparison with conventional materials. The magnesium plate can provide durability, rigidness, and/or protection. For instance, the magnesium plate can be positioned between a keypad and a PCB to protect from pressure induced by pressing keys associated with the keypad such that the stress to the PCB is greatly reduced. Moreover, the magnesium plate and/or chassis can include at least one opening for an electrical component, wherein the opening provides the electrical component to fit within the magnesium plate and/or chassis reducing the height of device.

Furthermore, an internal antenna can be placed in optimal positions to provide compact and durable devices. The internal antenna can be positioned in a substantially similar location as described for the clamshell smartphone and the messenger device. In addition, the internal antenna can be integrated onto the PCB associated with the thin smartphone, wherein the internal antenna is part of the PCB.

In accordance with an aspect of the claimed subject matter, a mono hinge provides a connecting mechanism for an upper portion and a lower portion associated with a device. The mono hinge can be made out of stainless steel, magnesium, and/or any other suitable material. The mono hinge can include a first coupling and a second coupling, wherein each coupling has an aperture related thereto. The mono hinge can provide physical connectivity and electrical connectivity for between at least two portions for a device. For instance, the mono hinge can provide physical and electrical connectivity between an upper portion and a lower portion related to a mobile communication device. In other aspects of the claimed subject matter, methods are provided that facilitate assembling novel hardware improvements related to a mobile communication device.

The following description and the annexed drawings set forth in detail certain illustrative aspects of the one or more embodiments for user interfaces for multimedia playback. These aspects are indicative, however, of but a few of the various ways in which the principles of the various embodiments may be employed and the described embodiments are intended to include all such aspects and their equivalents. Other advantages and novel features will become apparent from the following detailed description when considered in conjunction with the drawings.

DETAILED DESCRIPTION

Figure 1:
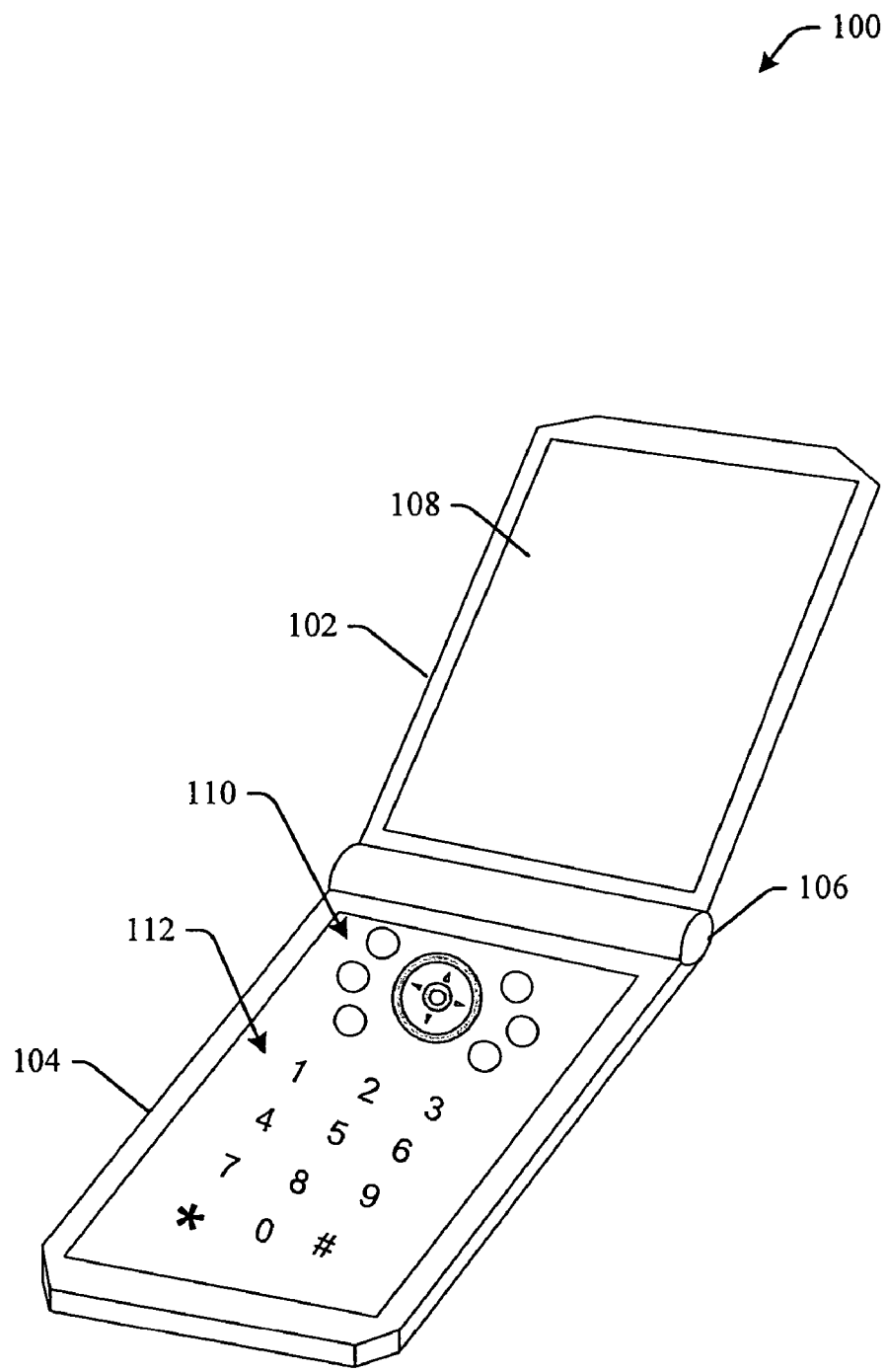
FIG. 1 illustrates an embodiment of a clamshell smartphone in accordance to an aspect of the claimed subject matter.

The systems and methods for the compact and durable communication devices are now described with reference to the drawings, wherein like reference numerals are used to refer to like elements throughout. In the following description, for purposes of explanation, numerous specific details are set forth in order to provide a thorough understanding of the systems and methods. It may be evident, however, that the systems and methods may be practiced without these specific details. In other instances, well-known structures and devices are shown in block diagram form in order to facilitate describing the systems and methods.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the systems may be implemented as a method, process, apparatus, or article of manufacture using standard programming and/or engineering techniques to produce software, firmware, hardware, or any combination thereof to control a computer to implement the disclosed systems. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD). . . ), smart cards, and flash memory devices (e.g., card, stick). Additionally, it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the subject systems and methods.

Artificial intelligence based systems (e.g., explicitly and/or implicitly trained classifiers) can be employed in connection with performing inference and/or probabilistic determinations and/or statistical-based determinations as in accordance with one or more aspects of the systems and methods as described hereinafter. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject systems and methods.

I. Clamshell Smartphone

Now turning to the figures, FIG. 1 illustrates a thin and durable clamshell smartphone that enhances mobile communication by reducing size and weight based at least in part upon various hardware improvements. As used herein, a smartphone is a mobile communication device with advanced information access features (e.g., web access, voicemail, calendar, personal digital assistant (PDA) functions, applications, information appliances, etc.). Moreover, the term "clamshell" refers to a device having a first portion and a second portion, wherein said first portion and said second portion are connected via a joint allowing the device to open and close about an axis with a motion that is at least partially circular. Furthermore, it is to be appreciated that the clamshell smartphone 100 can be substantially similar to a "flip-phone" having the smartphone characteristics. The subject innovation provides for internal hardware improvements and/or internal hardware arrangements that reduce the thickness of the clamshell smartphone 100 and increasing durability and rigidness (discussed infra).

The compact and durable clamshell smartphone 100 includes a top portion 102 and a bottom portion 104 connected via a joint 106. The top portion 102 can include a display screen 108 to allow various graphical items to be displayed. For instance, the display screen 108 can display numbers, letters, pictures, video, calendars, web pages, maps, any suitable data related to the clamshell smartphone 100, etc. to a user. The joint 106 provides the top portion 102 and the bottom portion 104 to move in at least a partially circular motion about an axis associated therewith. The bottom portion 104 can include various inputs such as, but not limited to a number keypad 112, and a navigation keypad 110. The number keypad 112 can be utilized to input numbers, letters, and/or symbols (e.g., wherein each number can be with a letter and/or symbol) allowing data entry to the clamshell smartphone 100. Furthermore, the navigation keypad 110 can allow various inputs related to functionality such as, but not limited to, general navigation, web access, voicemail, calendar, personal digital assistant (PDA) functions, applications, information appliances, etc.

Figure 2:
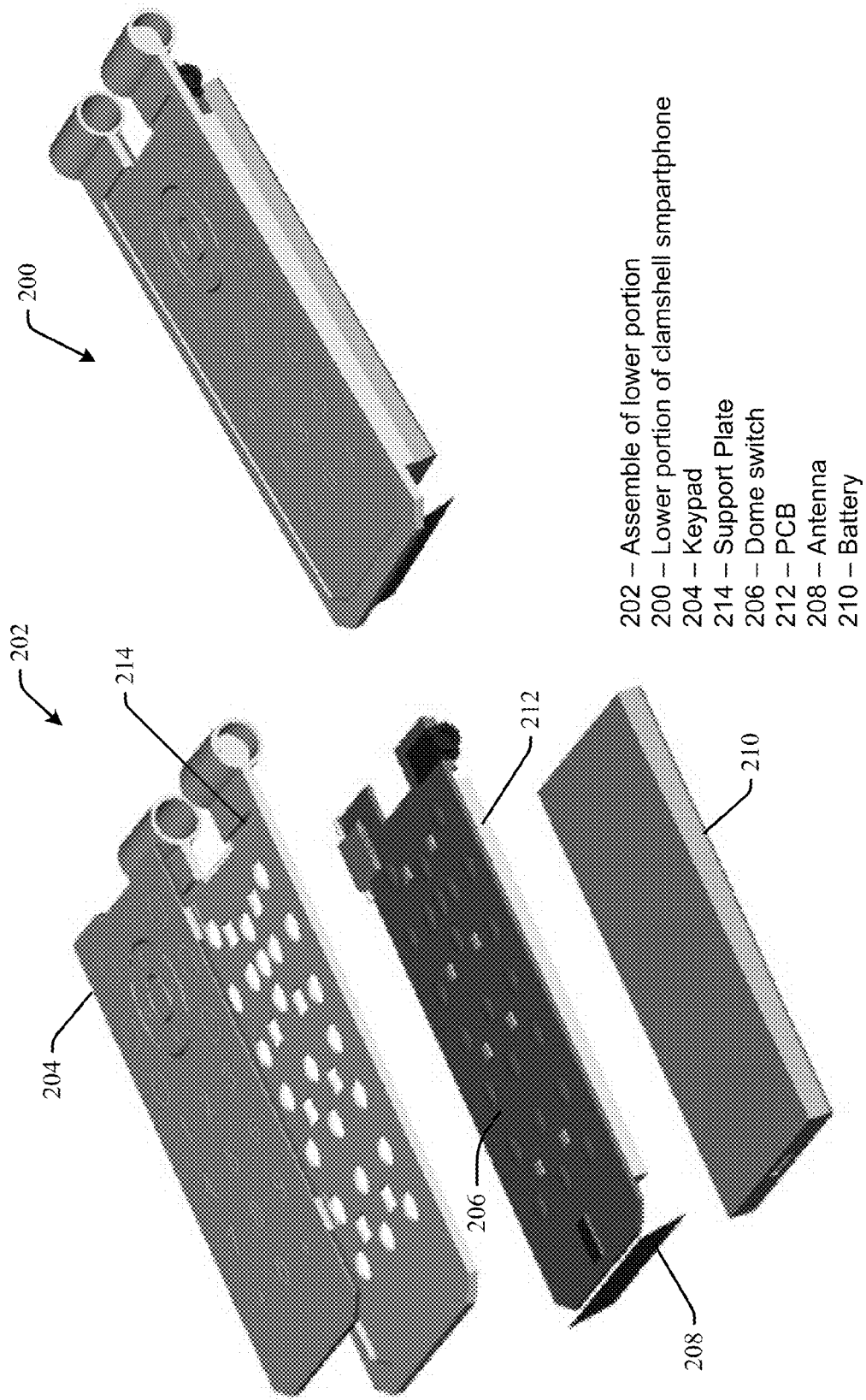
FIG. 2 illustrates an embodiment of a lower portion of a clamshell telephone.

FIG. 2 illustrates components of a lower portion 200 of a clamshell smartphone and an assembly 202 of the lower portion 200. The lower portion 200 can include various components that are assembled as depicted in FIG. 2. The assembly 202 of the clamshell smartphone can include a keypad 204 supported by a plate 214. It is to be appreciated that the plate 214 can be made out of magnesium and/or any other suitable material that can be easily and cost effectively mass produced. For instance, by producing the plate 214 out of magnesium, a plurality of benefits can be provided. For example, the plate 214 constructed from magnesium provides at least the following benefits in comparison to conventional plastics and/or materials for communication devices: enhanced absorption of shock, reduced buckling upon pressure, increased rigidness, reduced twistability, lighter weight, and improved feel.

Beneath the plate 214 of the assembly 202 can be a printed circuit board (PCB) 212 that can include at least one dome switch 206 and an internal antenna 208. By placing the plate 214 between the keypad 204 and the PCB 208, the plate 214 protects the PCB 208 from pressure induced by pressing keys associated with the keypad 204. It is to be appreciated that the plate 214, when constructed from magnesium, provides improved durability and protection in comparison to conventional materials (e.g., plastics, rubber, latex, etc.). Under the PCB 212 can be a battery 210 that provides power to the clamshell smartphone. The underside of the battery 210 can be contained in a plastic casing (not shown) with optional battery cover (not shown) that holds the innards within the lower portion 200.

The internal antenna 208 can be located inside the base of the lower portion 200, wherein the internal antenna 208 is vertical on the base of the PCB 208. Such placement of the internal antenna 208 does not add to the thickness of the clamshell smartphone and/or any other communication device utilizing such internal antenna 208 placement. In addition, the internal antenna 208 can be located close to a radio module (not shown). Moving the internal antenna 208 into the lower portion 200 protects the antenna from being manually extended, bent, and/or broken off the device.

Figure 5:
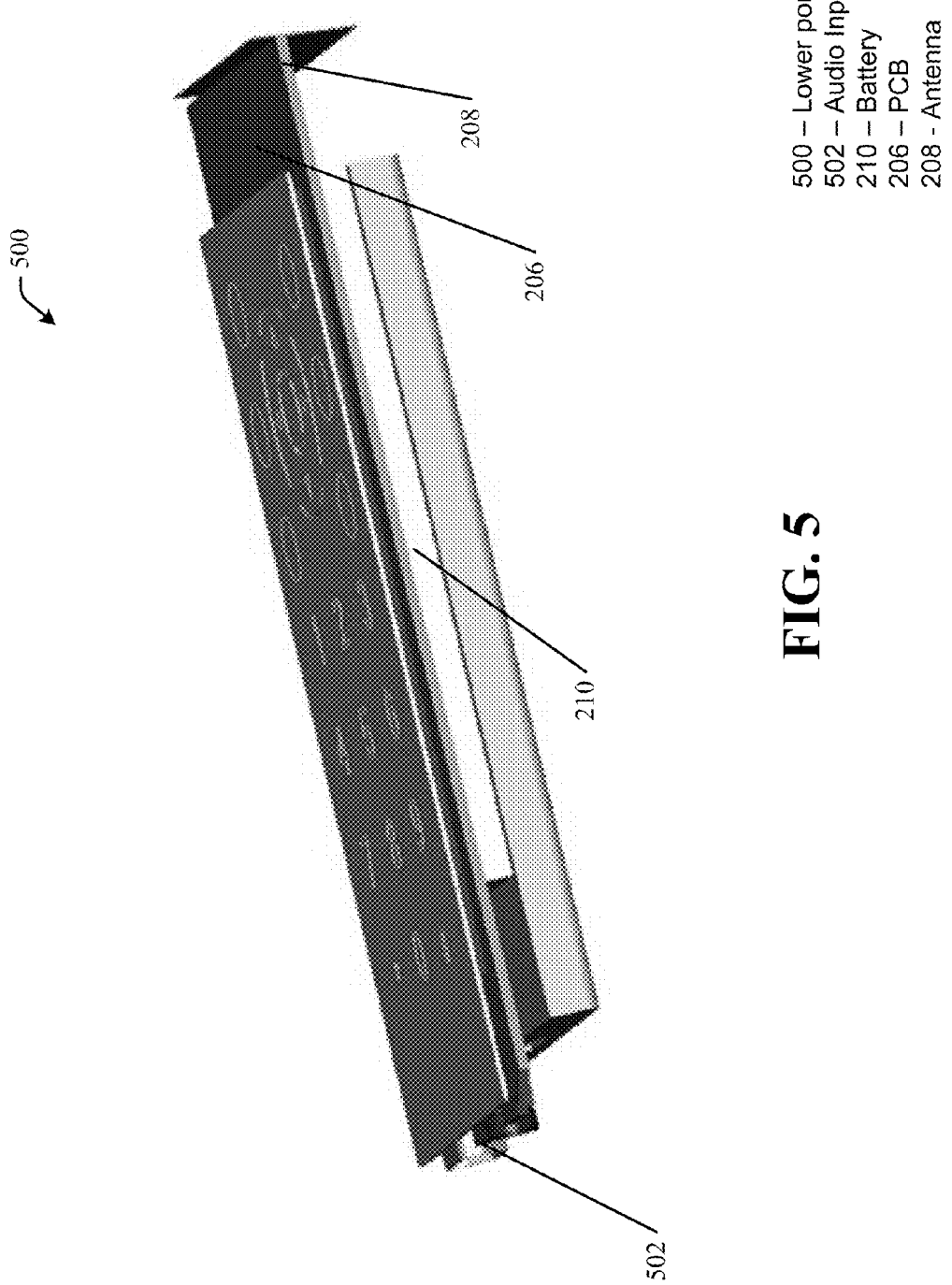
FIG. 5 illustrates an assembled embodiment of a lower portion of a clamshell communication device.

In another aspect in accordance with the claimed subject matter, the internal antenna 208 can be located at the top of the lower portion near the hinge as illustrated by FIG. 5. FIG. 5 illustrates a lower portion 500 the clamshell smartphone. The lower portion 500 can implement the internal antenna 208 at the upper portion of the PCB 206 in the substantially similar manner as depicted in FIG. 2. Thus, the internal antenna 208 is vertical on the upper portion of the PCB 206 such that the internal antenna 208 does not increase the overall thickness of the clamshell smartphone. Furthermore, the placement of the internal antenna 208 at the top portion of the PCB 206 allows for an audio input 502 to be incorporated within the lower portion 500. For instance, the audio input 502 can allow various devices to be utilized in connection with the clamshell smartphone to provide audio such as, but not limited to, speakers, headphones, speaker phone devices, etc.

Referring to FIG. 2 and FIG. 5, it is to be appreciated that the PCB 206 can have a top, a bottom, and a thickness, wherein the PCB 206 has a bottom plane that can be perpendicular to the thickness of the PCB 206 located at the bottom of the PCB 206. The internal antenna 208 can be planar to the bottom plane of the PCB 206 and the internal antenna 208 can have a length that can be placed across the width of the PCB 206. In addition, the PCB 206 can have a top plane that can be perpendicular to the thickness of the PCB 206 located at the top of the PCB 206. The internal antenna 208 can be planar to the top plane of the PCB 206 and the internal antenna 206 can have a length that can be placed across the width of the PCB 206.

Figure 3:
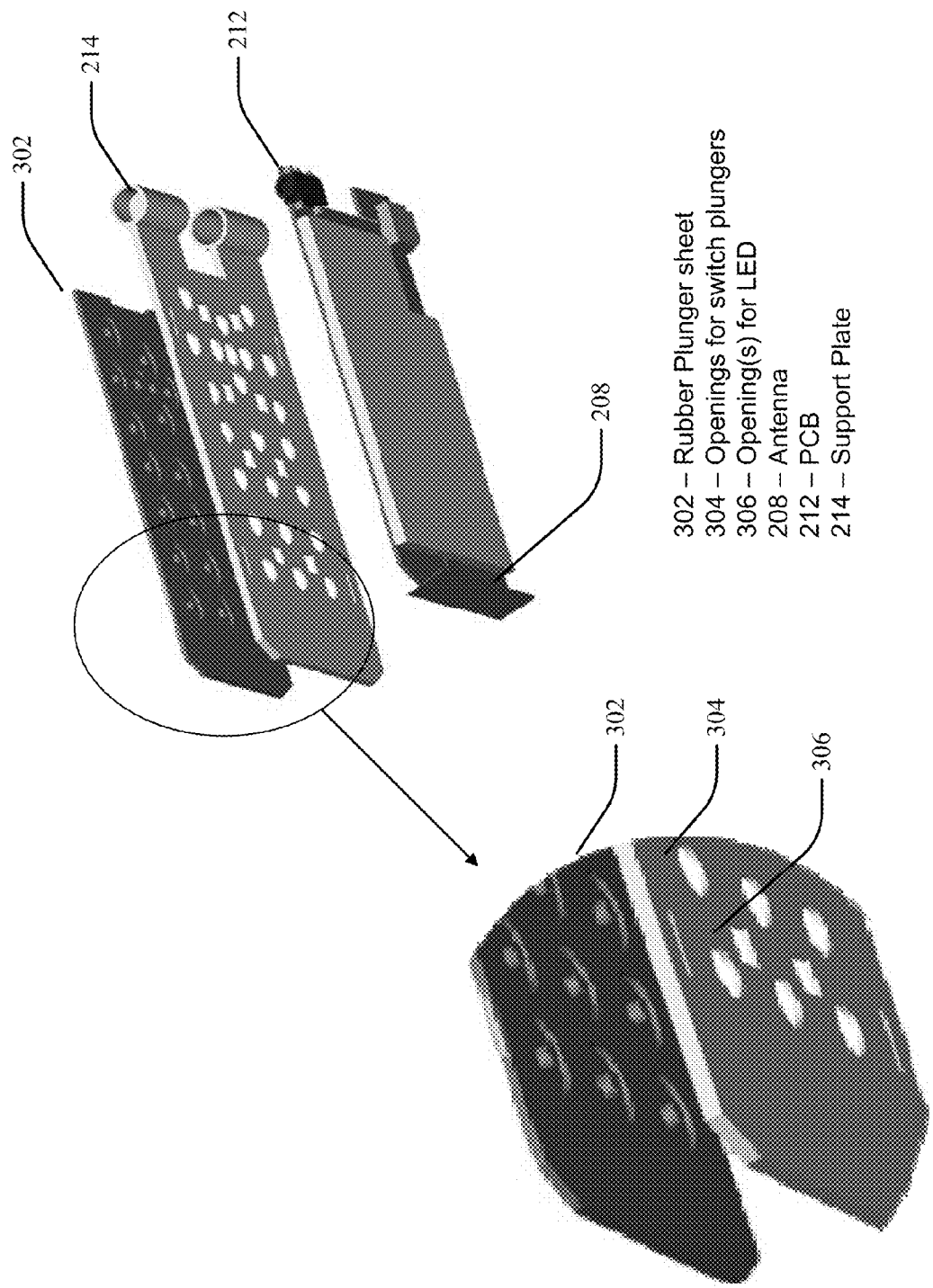
FIG. 3 illustrates an embodiment of a lower portion of a clamshell telephone including a detail of a support plate.
Figure 4:
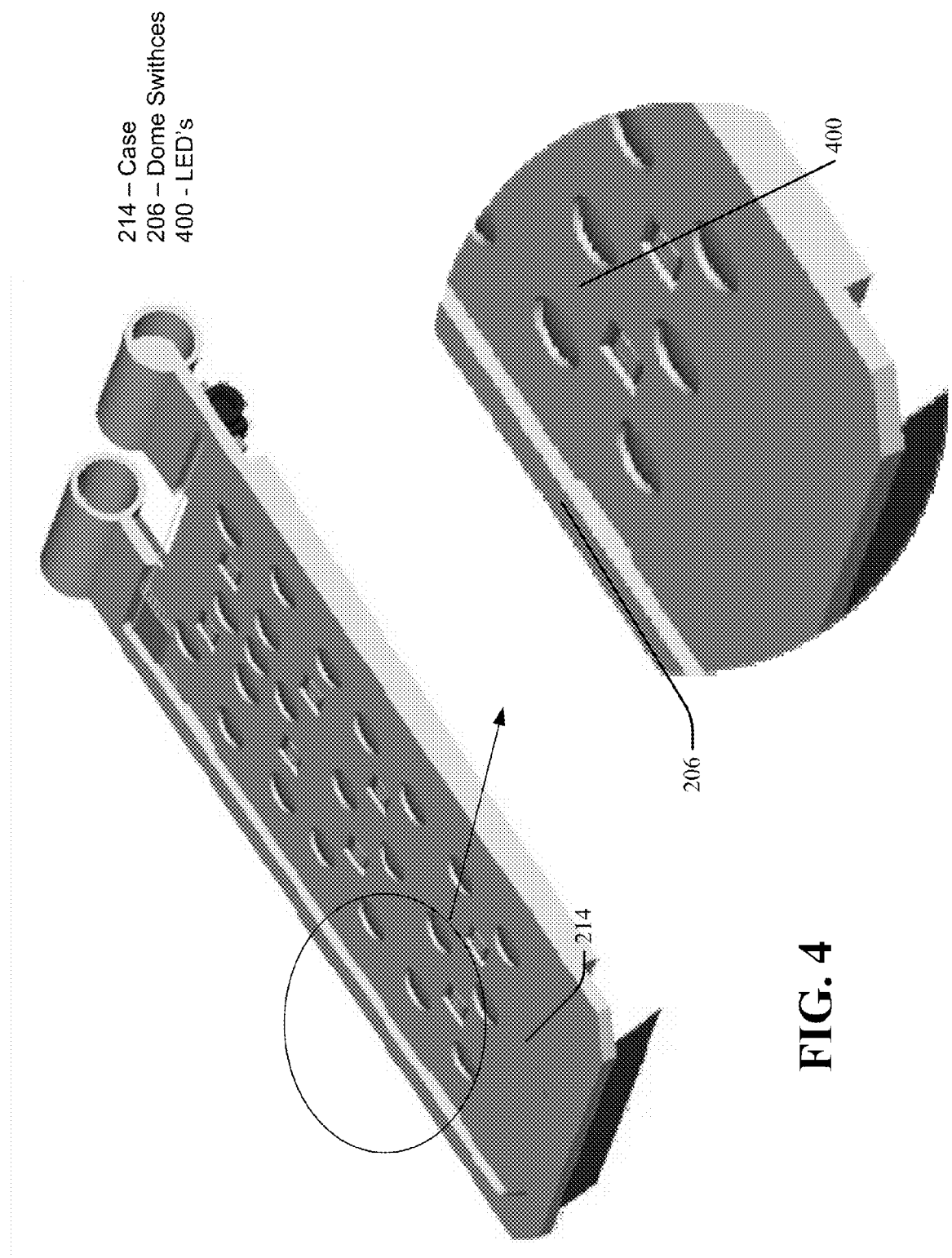
FIG. 4 illustrates an embodiment of a keypad support assembled with a printed circuit board (PCB).

Turning to FIG. 3, the lower portion of the clamshell smartphone can include a rubber plunger sheet 302 seated between the keypad 204 shown in FIG. 2 and the case 214. The case may include a set of holes 304 (e.g., a set of openings) for the switch plungers of the rubber plunger sheet 302 and a set of holes 306 (e.g., a set of openings) for at least one light emitting diode (LED). When assembled, the set of holes 304 for the switch plungers align with the dome switches 206 of the PCB 212 and the set of holes 306 for the LEDs align with the LEDs located on the PCB 212. The set of holes 304 for the switch plungers allow the plungers to activate the dome switches 206 on the PCB 212 when pressure is exerted on the keypad. The set of holes 306 for the LEDs allow the LEDs to illuminate the keys. Referring to FIG. 4 briefly, the case 214 is illustrated with a portion thereof enlarged. The enlarged portion of the case 214 depicts an assembled portion of the clamshell smartphone with the dome switches 206 and an LED 402 slotted into the case 214 to provide extreme thinness. In other words, the dome switches 206 and the LEDs 402 are nestled into the case 214 in respective holes associated therewith.

Conventional devices use electroluminescent (EL) backlight to illuminate keypads, yet such lighting techniques are expensive and noisy (e.g., to the ear). It is to be appreciated that the subject innovation provides the set of holes 306 for the LEDs 400 to allow the decrease in thickness of the overall clamshell smartphone. In particular, the novel assembly embeds the LEDs 400 into the case 214 (e.g., within the holes) allowing the LED 400 to sit within the clamshell smartphone without increasing the overall thickness. Traditionally, LEDs are not placed through specifically tailored holes and the entire height of the LED is added to the overall thickness of the communication device.

II. Messenger Device

Figure 6:
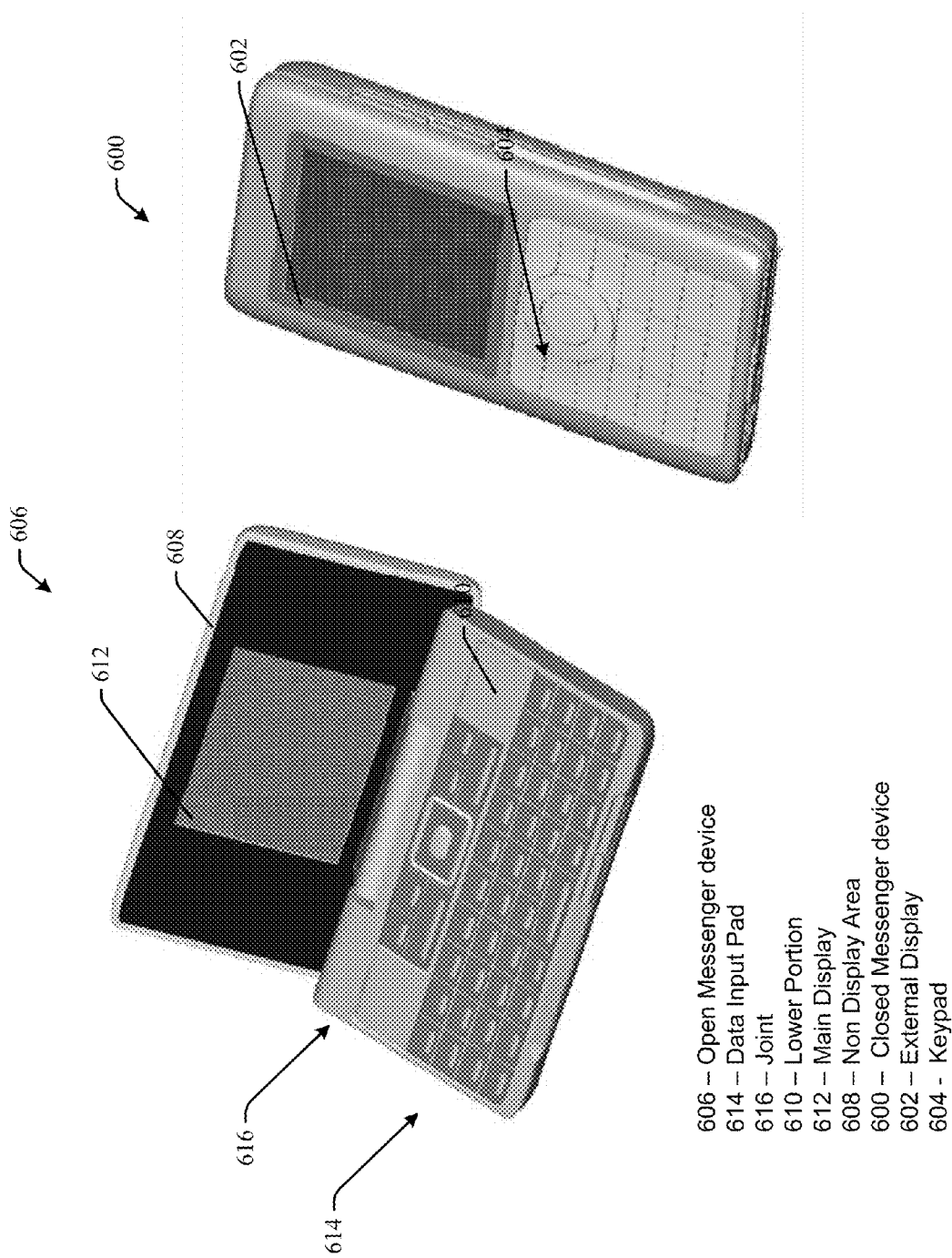
FIG. 6 illustrates an embodiment of a messenger device in an open and closed position in accordance with an aspect of the subject innovation.

Referring now to FIG. 6, a compact, thin, light-weight and durable messenger device 600 is illustrated that provides communication capabilities. The messenger device 600 is depicted in a closed position, wherein such closed position allows the messenger device to function substantially similar to a smartphone device. It is to be appreciated that a smartphone device can be a mobile communication device with advanced information access features (e.g., web access, voicemail, calendar, personal digital assistant (PDA) functions, applications, information appliances, etc.). The messenger device 600 when in the closed position includes an external display screen 602 and an external keypad input 604. The external display screen 602 allows various graphical items to be displayed. For instance, the external display screen 602 can display numbers, letters, pictures, video, calendars, web pages, maps, etc. to a user. The external keypad input 604 can be utilized to input numbers, letters, and/or symbols (e.g., wherein each number can be with a letter and/or symbol) allowing data entry. In addition, the external keypad input 604 can allow various input related to functionality such as, but not limited to, web access, voicemail, calendar, personal digital assistant (PDA) functions, applications, information appliances, etc.

The messenger device 600 is illustrated at an open position 606, wherein the open position allows the messenger device 600 to provide messenger functionality (e.g., email, text messages, images, graphic illustrations, etc.). The open position 606 provides an upper portion 608 and a lower portion 610, wherein the upper portion includes an internal display screen 612 to view graphics and the lower portion includes an internal keypad input 614. For instance, a user can create, read, send a text message utilizing the messenger device 600 in the open position 606 such that the internal display screen 612 allows graphic display and the internal keypad input 614 allows data input. In addition, the upper portion 608 and the lower portion 610 are connected via a joint 616, wherein the upper portion 608 and the lower portion 610 can move in at least in a partially circular motion about an axis associated therewith. It is to be appreciated and understood that various hardware improvements and novel assembly of components (discussed infra) provides the messenger device 600 to be thin, durable, lightweight and vastly enhanced in comparison to traditional messenger devices.

Figure 7:
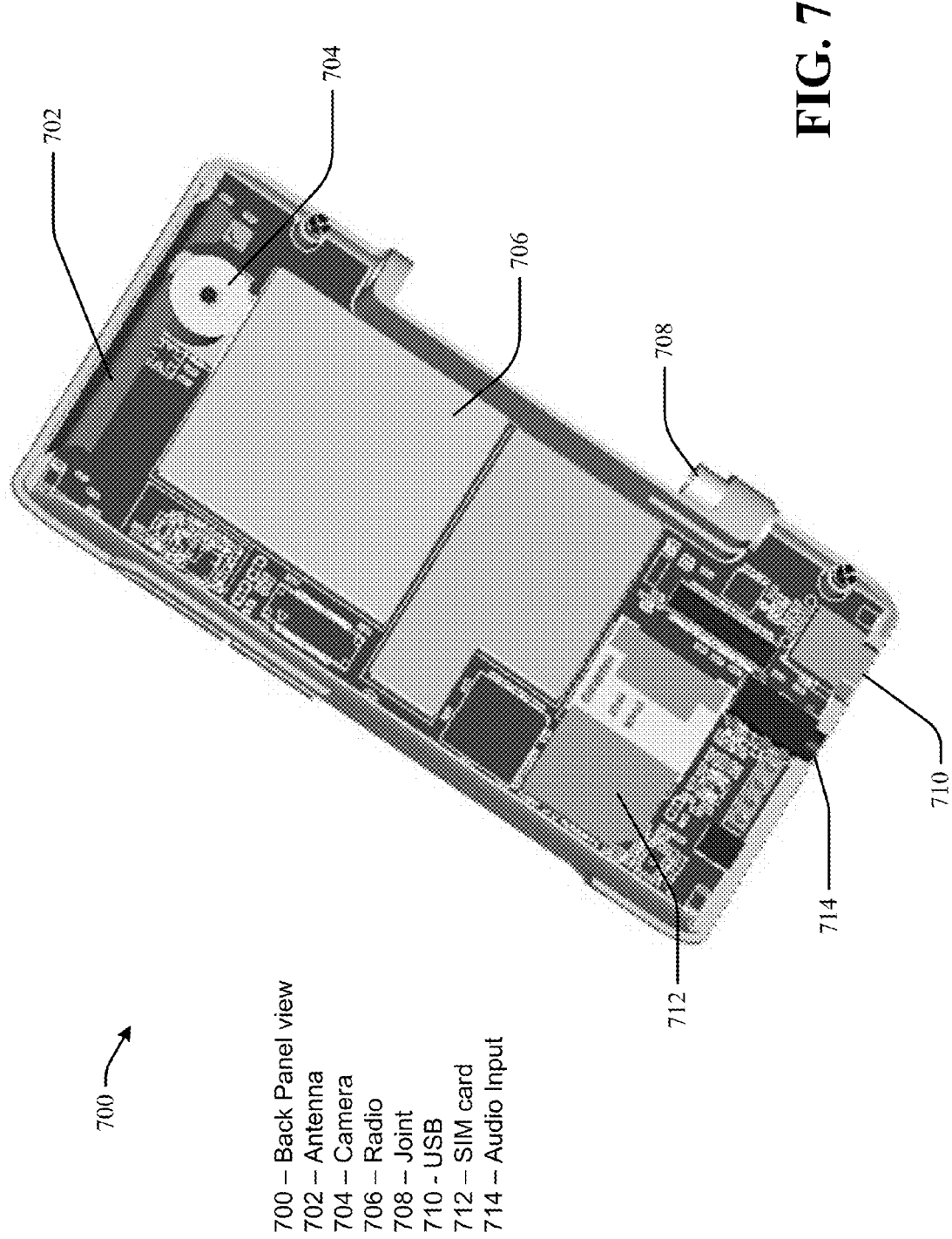
FIG. 7 illustrates an embodiment of a back panel for a messenger device.

FIG. 7 illustrates an embodiment of a back panel for a messenger device. A back panel view 700 of a messenger device illustrates the internal components that provide ultra thin characteristics. The back panel view 700 depicts the messenger device that includes an internal antenna 702 that is partly vertical located an area around a camera 704, and above a radio 706. It is to be appreciated that the internal antenna 702 can be substantially similar to the internal antenna described in association with the clamshell smartphone (discussed supra). Thus, the internal antenna 702 can be vertical on the upper portion of the PCB such that the internal antenna 702 does not increase the overall thickness of the messenger device. Moreover, locating the internal antenna 702 inside the messenger device serves to protect the antenna and prevents the antenna from being bent or broken.

It is to be appreciated that the PCB can have a top, a bottom, and a thickness, wherein the PCB has a bottom plane that can be perpendicular to the thickness of the PCB located at the bottom of the PCB. The internal antenna 702 can be planar to the bottom plane of the PCB and the internal antenna 702 can have a length that can be placed across the width of the PCB. In addition, the PCB can have a top plane that can be perpendicular to the thickness of the PCB located at the top of the PCB. The internal antenna 702 can be planar to the top plane of the PCB and the internal antenna 702 can have a length that can be placed across the width of the PCB.

Furthermore, the back panel view 700 illustrates the messenger device which includes a joint 708 (e.g., providing at least a partially circular motion about an axis for at least one of an upper portion and a lower portion as seen in FIG. 6), a subscriber identity module (SIM) card 712, a universal serial bus (USB) 710, and an audio input 714. The SIM card 712 provides storing of key identifying data related to a mobile communication device service provider, subscribing information, preferences, text messages, images, address book data, any data related to the mobile communication device, etc. The USB 710 and the audio input 714 provide connectivity for other components and/or devices such as, but not limited to, blue tooth devices, data synchronization connections, speakers, headphones, speaker phone devices, various input devices, etc.

Figure 8:
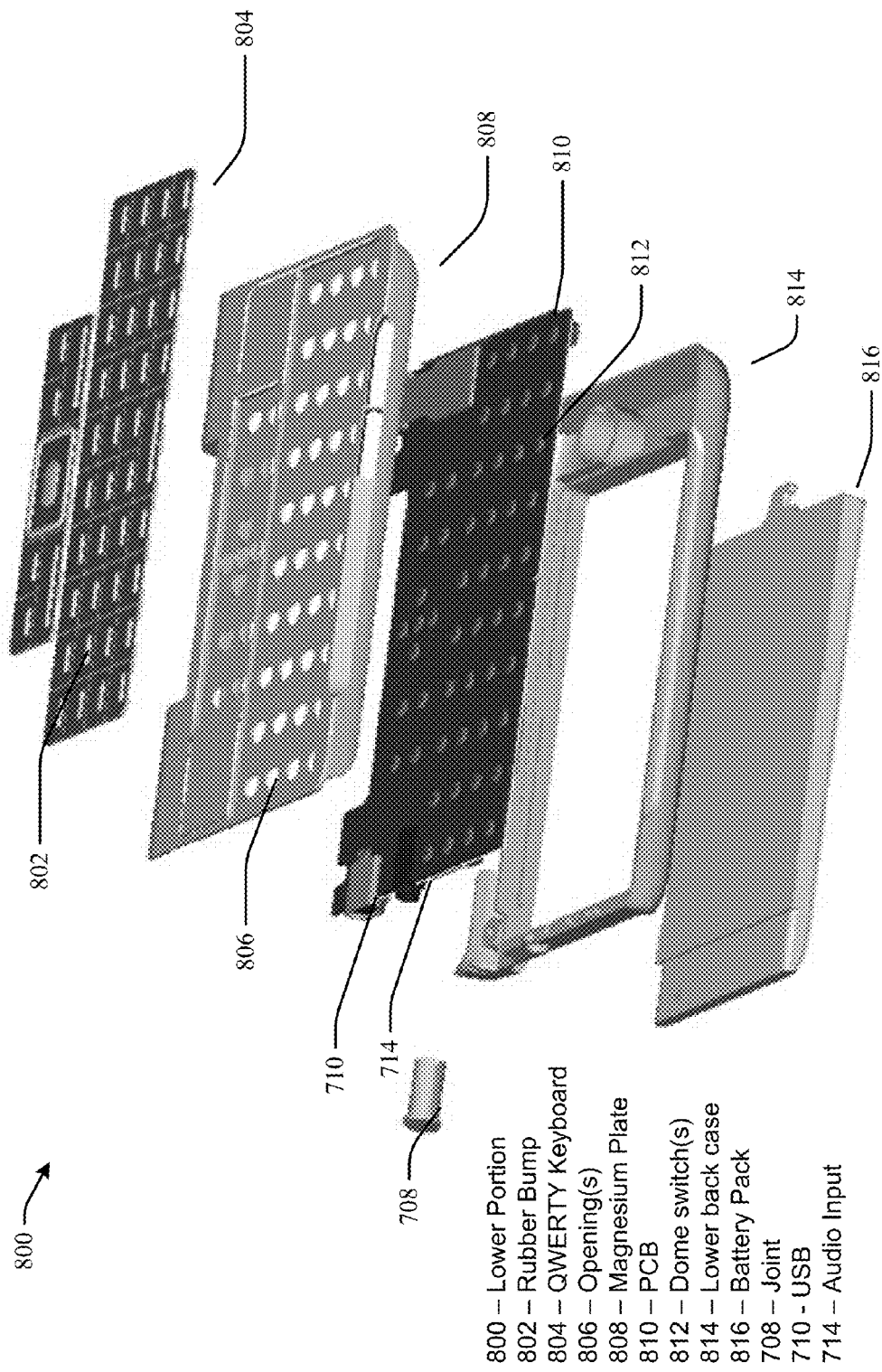
FIG. 8 illustrates an embodiment of a lower portion of the messenger device with a view of assembly from the topside of the keyboard portion.

Turning to FIG. 8, an embodiment of a lower portion of the messenger device with a view of assembly from the topside of the keyboard portion is illustrated. A lower portion 800 of the messenger device contains the internal keypad input portion (e.g., internal keypad input associated with the lower portion as seen in FIG. 6). The assembly of the lower portion 800 includes a QWERTY keyboard 804 with at least one rubber bump 802 to enhance typing experience and/or a data entry from, for instance, a user. The lower portion 800 further includes a plate 808 made from magnesium and/or any other suitable material that can be easily and cost effectively mass produced. For instance, by producing the plate 808 out of magnesium, a plurality of benefits can be provided. For example, the plate 808 constructed from magnesium provides at least the following benefits in comparison to conventional plastics and/or materials (e.g., plastics, rubber, latex, etc.) for communication devices: enhanced absorption of shock, reduced buckling upon pressure, increased rigidity, reduced twistability, lighter weight, and improved feel. By placing the plate 808 between the QWERTY keyboard 804 and a PCB assembly 810, the plate 808 protects the PCB assembly 810 from pressure induced by pressing keys associated with the QWERTY keyboard 804. The plate 808 can contain at least one hole 806 (e.g., at least one opening) for at least one switch plunger (not shown), wherein the assembled lower portion 800 provides the at least one hole 806 to align with at least one dome switch 812 of the PCB assembly 810. In other words, the at least one hole 806 for the switch plungers allow the plungers to activate the at least one dome switch 812 on the PCB assembly 810 when pressure is exerted on the QWERTY keyboard 804.

Beneath the PCB assembly 810 can be a lower back case 814 and a battery pack 816. It is to be appreciated that the lower back case 814 can be made out of magnesium to provide improved durability and rigidity. Yet, based on cost efficiency, conventional materials can be utilized without inhibiting the novelty of the claimed subject matter. The lower back case 814 can provide enclosure for the assembly of the lower portion 800 related to the messenger device. In addition, the battery pack 816 can provide any necessary power to the messenger device. In one example, the lower back case 814 can include a battery cover (not shown) to allow battery maintenance and/or replacement.

Figure 9:
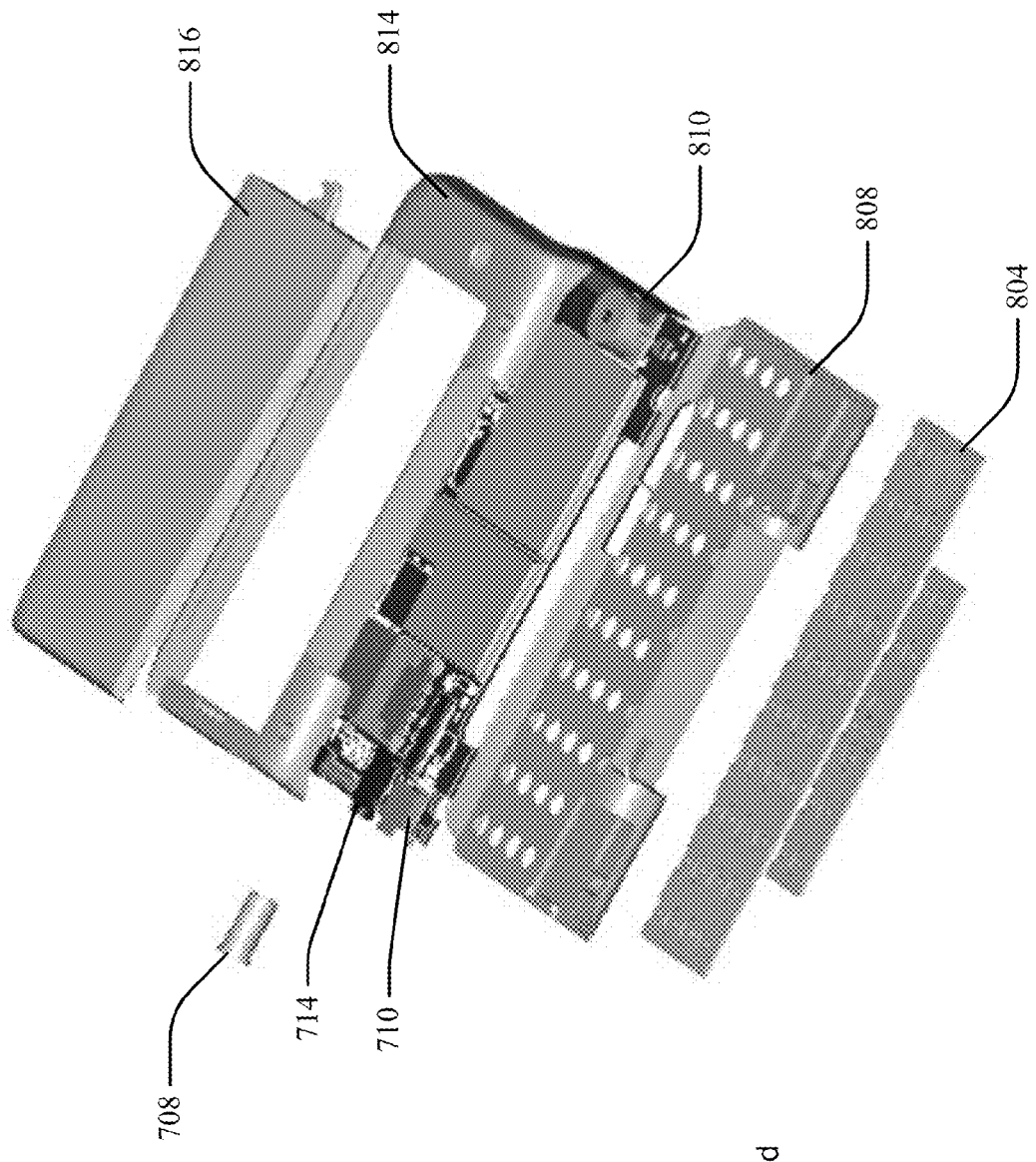
FIG. 9 illustrates an assembly of the components of the lower portion of a messenger device with a view of assembly from the underside of the keyboard portion.

FIG. 9 illustrates an embodiment of a lower portion of the messenger device with a view of assembly from the underside of the keyboard portion, which includes the components described above in FIG. 8.

Figure 10:
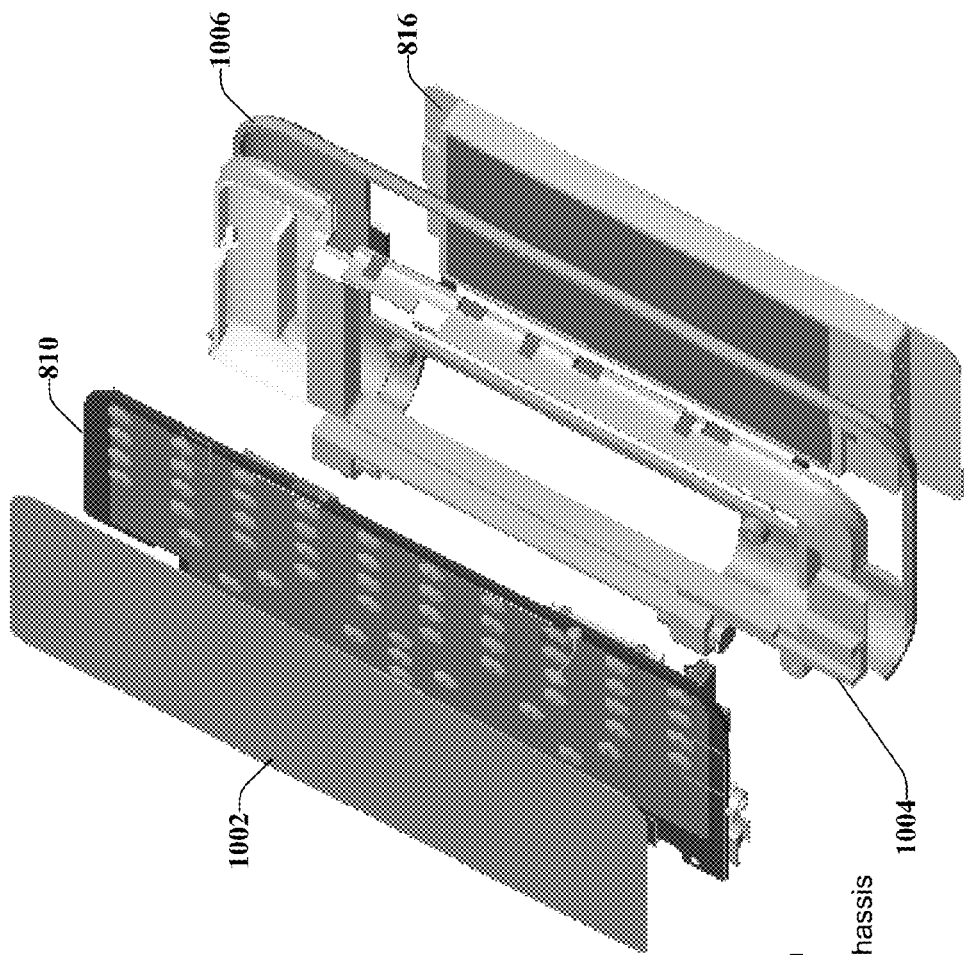
FIG. 10 illustrates an assembly of the components of the lower portion of a messenger device.

FIG. 10 illustrates an embodiment of a lower portion 1000 of the messenger device. The alternative configuration of the lower portion 1000 can include a pocket for the battery pack 816 to reduce size of the messenger device. The lower portion 1000 can include a keypad 1002 above the PCB assembly 810. A magnesium chassis 1004 can be implemented between the PCB assembly 810 and the back cover 1006. The battery pack 816 can then be placed into an opening related to the back cover 1006 and placed into the pocket associated with the magnesium chassis 1004. The magnesium chassis 1004 can be an internal chassis with the pocket for the battery pack 816, wherein such pocket can reduce the thickness and still provide enough rigidity to pass various tests (e.g., drop test, drop test, etc.). The hinge area in both the upper and lower half can be constructed out of magnesium and/or any suitable material as described above. It is to be appreciated that the keypad 1002 rests on the PCB assembly 810 but the PCB assembly 810 is supported by magnesium to keep it from stressing, bending, etc.

Figure 11:
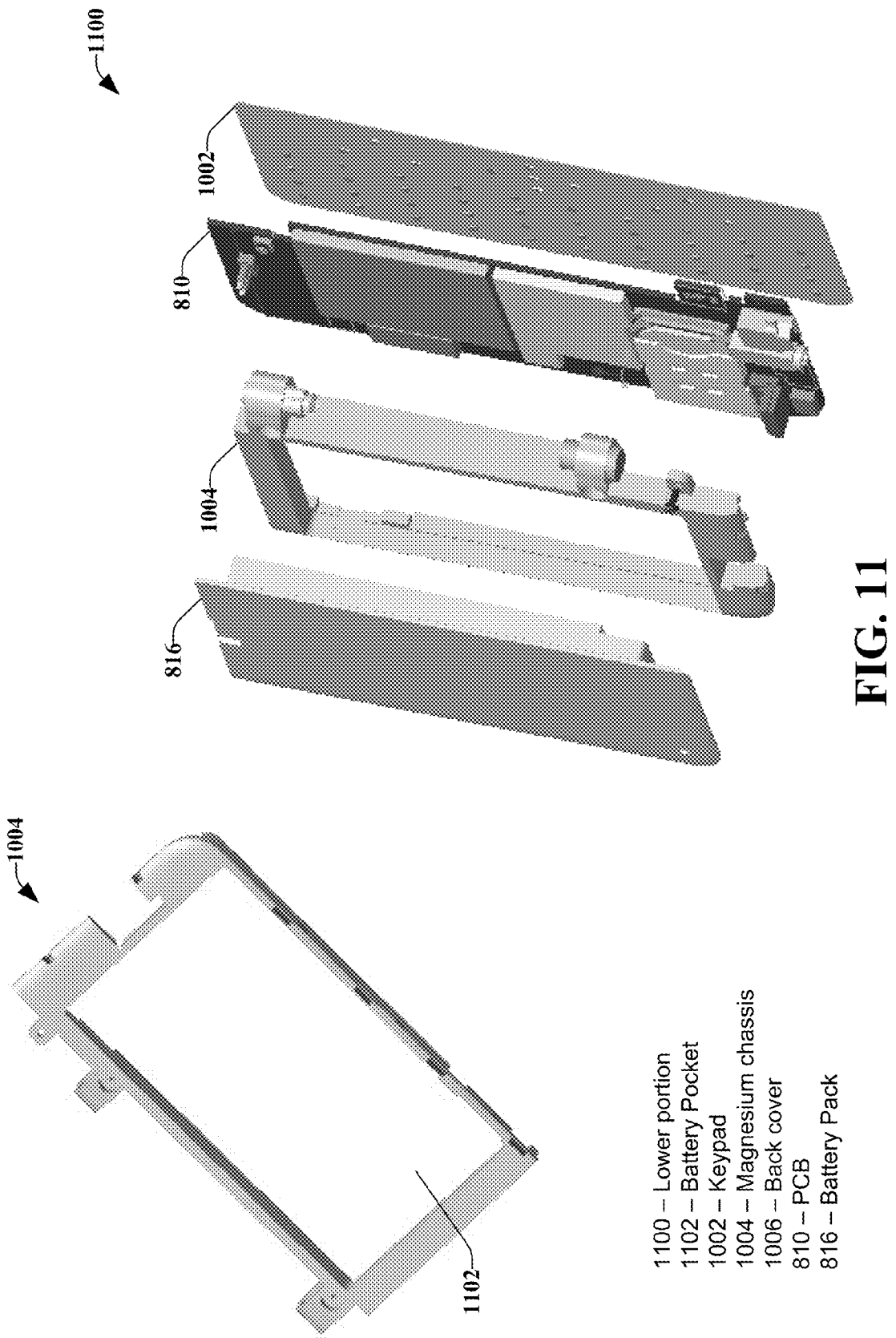
FIG. 11 illustrates an assembly of the components of the lower portion of a messenger device.

Turning to FIG. 11, a lower portion 1100 is illustrated of a messenger device. The lower portion 1100 is substantially similar to the lower portion 1000 in FIG. 10, yet viewed from the battery pack 816 as the top-most component. Moreover, the magnesium chassis 1004 is illustrated with a pocket 1102 for the battery pack 816 as described above. It is to be appreciated that the magnesium chassis 1004 can provide the following: hold the hinge; provide support around the PCB assembly 810; capture the battery pack 816; and provide stiffness and/or durable to pass shock and/or drop tests.

Figure 12:
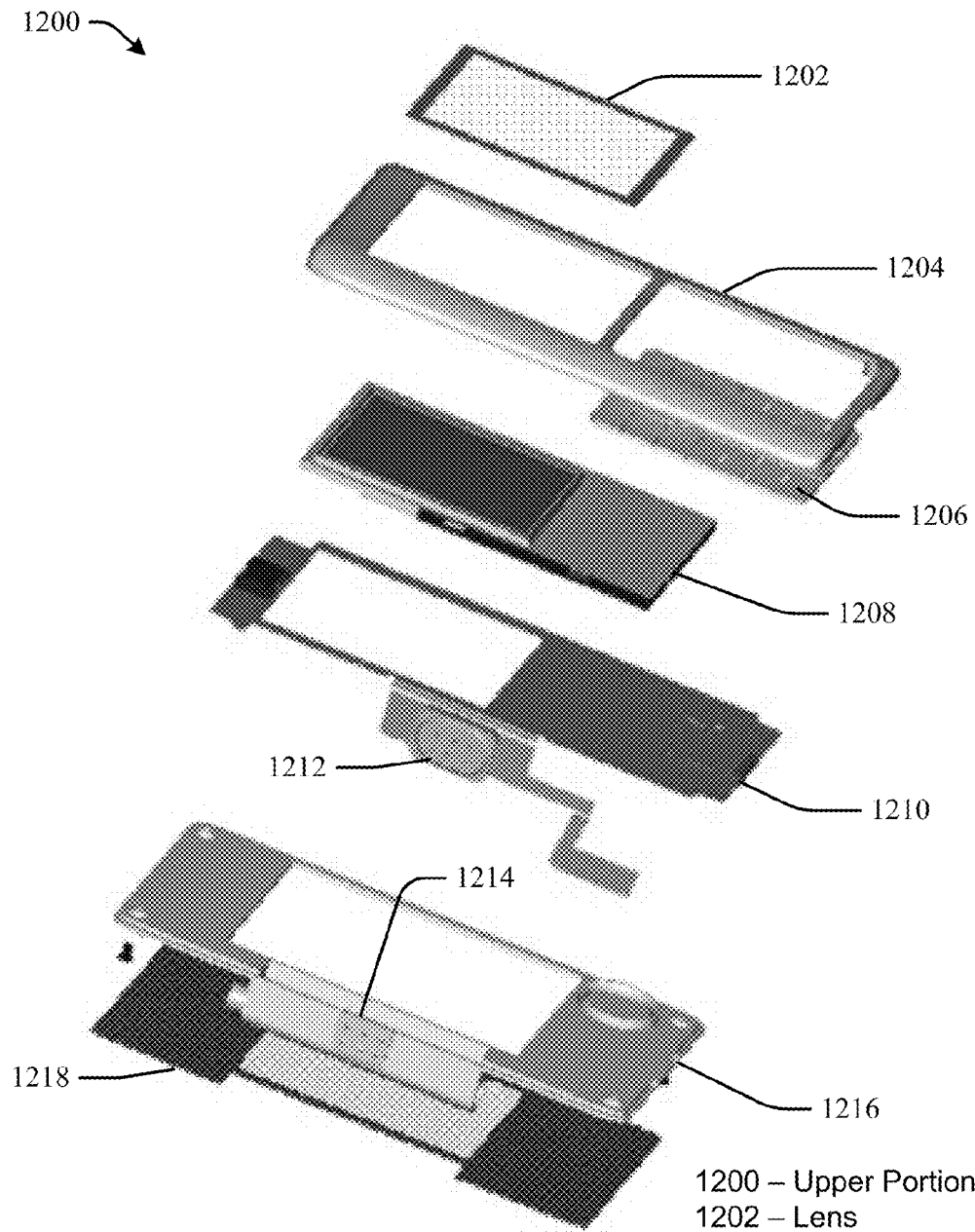
FIG. 12 illustrates an assembly of the components of the upper portion of a messenger device in accordance to an aspect of the subject innovation.

FIG. 12 illustrates an assembly of the components of the upper portion of a messenger device in accordance to an aspect of the subject innovation. An upper portion 1200 of the messenger device is illustrated, wherein various components related to the upper portion 1200 are assembled accordingly. The upper portion 1200 includes a lens 1202, an upper front case 1204 and a keypad 1206. The upper portion further includes a dual display 1208 that can be located between the upper front case 1204 and a flex PCB 1210. The flex PCB 1210 can further include a speaker 1212. It is to be appreciated that the speaker 1212 can be affixed to the flex PCB 1210 in an area associated with a joint 1214. The joint 1214 can connect the upper portion 1200 of the messenger device to the lower portion (described supra) of the messenger device such that at least a partially circular movement about an axis associated therewith can be provided.

Between the flex PCB 1210 and an inner lens 1218 can be an upper inner plate 1216. In other words, the flex PCB 1210 can be seated on the upper inner plate 1216 and the upper inner plate 1216 can be seated on the inner lens 1218. The inner plate 1216 can be made from magnesium and/or any other suitable material. As discussed above, making the inner plate 1216 from at least a portion of magnesium provides enhanced absorption of shock, reduced buckling upon pressure, increased rigidness, reduced twistabiliy, and improved durability, protection, and feel. The inner lens 1218 can be proximate to the upper inner plate 1216.

Figure 13:
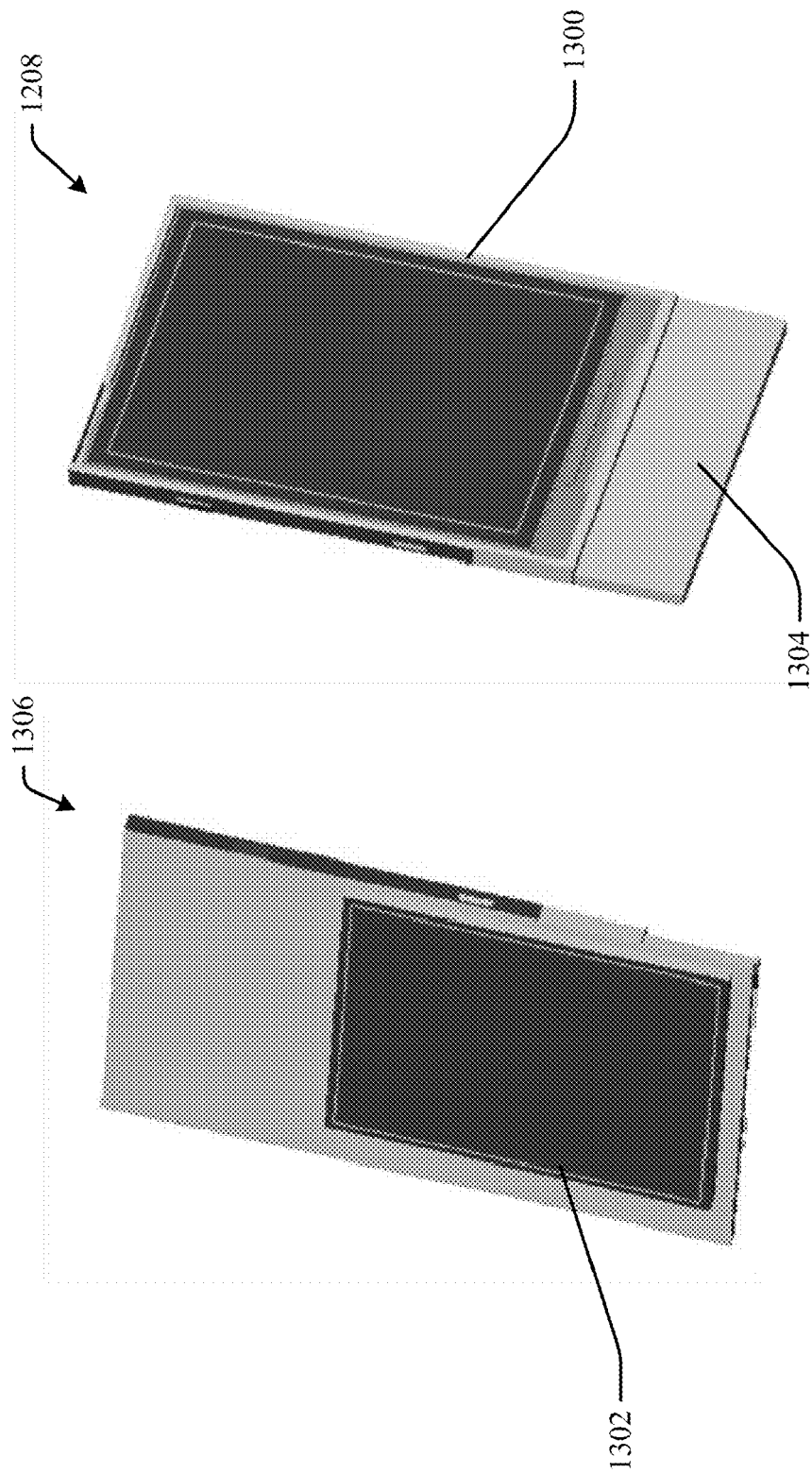
FIG. 13 illustrates an embodiment of a dual display utilized in connection with the upper portion of a messenger device.

FIG. 13 illustrates an embodiment of a dual display utilized in connection with the upper portion of a messenger device. A first side related to the dual display 1208 can include a main display 1300, while a second side 1306 can include a secondary display 1302. It is to be appreciated that the main display 1300 and the secondary display 1302 can be any suitable display panel such as, but not limited to, liquid crystal display (LCD), flat-panel, etc. The main display 1300 can utilize a backlight (e.g., an EL backlight) that can be extended into the area 1304 to allow sharing said backlight between the main display 1300 and the secondary display 1302. It is to be appreciated that the backlight can be utilized by both the main display 1300 and the secondary display 1302, wherein the backlight is extended beyond the active area of the main display 1300 into the area 1304. Based at least in part upon the extension of the backlight into the area 1304, the main display 1300 can be large and also allow for a large area for a keypad. It is to be appreciated and understood that the extension of the backlight can be toward any suitable area not covered by at least one display to provide the capability of sharing the backlight between the displays. For instance, the extension can be on the opposite side of the active area, below the active area, above the active area, etc. By utilizing the technique of extending the backlight into the area 1304, any external display (e.g., main display 1300) can be offset allowing space for keypad, data input pad, etc. Furthermore, extending the backlight of the main display 1300 shared by the secondary display 1302 can lowers cost and results in a thinner display module. Moreover, the backlight can be extended in at least one direction beyond each of the respective viewing areas (e.g., the main display and the secondary display).

In accordance with another aspect of the subject innovation, the messenger device can utilize LEDs to provide illumination to the device. It is to be appreciated and understood that the LEDs can be nestled into the respective plate in order to provide maximum thinness as described above in connection with the clamshell smartphone. Yet, utilization of LEDs nestled within the case may not be appropriate based at least in part upon the number of keys.

III. Thin Smartphone

Figure 14:
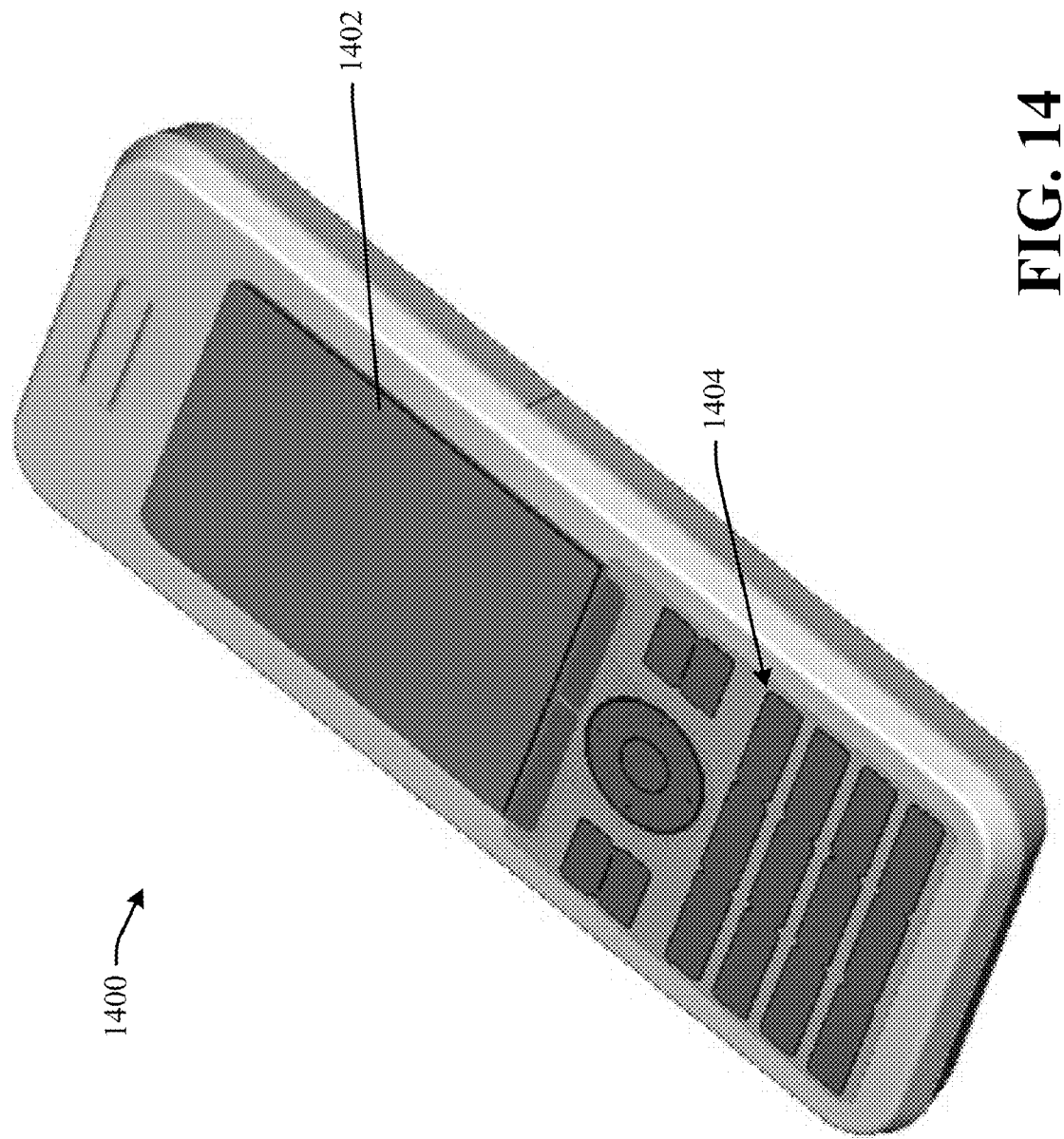
FIG. 14 illustrates an embodiment of a thin smartphone in accordance with an aspect of the claimed subject matter.

FIG. 14 illustrates an embodiment of a thin smartphone 1400 in accordance with an aspect of the claimed subject matter. The subject innovation provides for internal hardware improvements and/or internal hardware arrangements that reduce the thickness of the thin smartphone 1400 and increasing durability and rigidness (discussed infra). As used herein, a smartphone is a mobile communication device with advanced information access features (e.g., web access, voicemail, calendar, personal digital assistant (PDA) functions, applications, information appliances, etc.). For instance, the thin smartphone 1400 employs extreme thinness unmatched by conventional mobile communication devices based at least in part upon assembly techniques, component placement, and/or materials employed.

The thin smartphone 1400 can include a display screen 1402 to allow various graphical items to be displayed. For instance, the display screen 1402 can display numbers, letters, pictures, video, calendars, web pages, maps, any suitable data related to the thin smartphone 1400, etc. to a user. In addition, the thin smartphone 1400 can include various inputs 1404. For example, the inputs 1404 can be, but are not limited to, a number keypad, and a navigation keypad, etc. The number keypad can be utilized to input numbers, letters, and/or symbols (e.g., wherein each number can be with a letter and/or symbol) allowing data entry to the thin smartphone 1400. Furthermore, the navigation keypad can allow a plurality of data entry related to functionality such as, but not limited to, general navigation, web access, voicemail, calendar, personal digital assistant (PDA) functions, applications, information appliances, etc.

Figure 15:
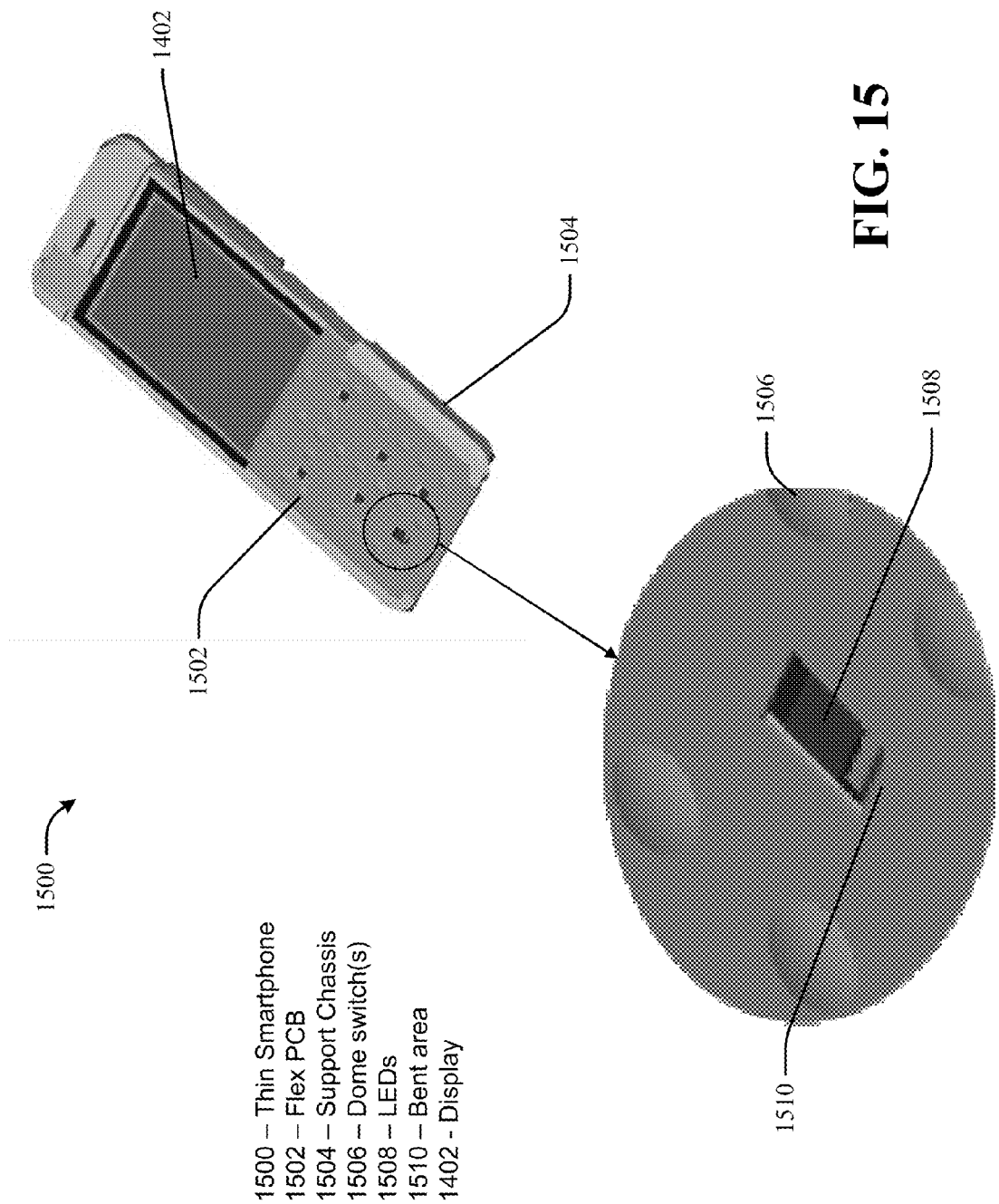
FIG. 15 illustrates an embodiment of a flexible printed circuit board (PCB) of a thin smartphone.

FIG. 15 illustrates an embodiment of a flexible printed circuit board (PCB) of a thin smartphone. A thin smartphone 1500 is illustrated, wherein the internal assembly and layout provides durability, thinness, and/or rigidness. The thin smartphone 1500 includes a chassis 1504 that supports the keypad, side, and switches. The chassis 1504 can hold various components together, support the display screen 1402, and provide stiffness for the thin smartphone 1500. It is to be appreciated that the display screen 1402 can be an LCD screen, flat-panel, and/or any suitable thin display. The chassis 1504 further allows the softkeys and switches to be located close to the display screen 1402. Moreover, the chassis 1504 can support at least one switch to allow the at least one switch up closer to the display screen 1402. Furthermore, the chassis 1504 can be made from magnesium or any other suitable material. For instance, by producing the chassis 1504 out of magnesium, a plurality of benefits can be provided. For example, the chassis 1504 constructed from magnesium provides at least the following benefits in comparison to conventional plastics and/or materials for communication devices: enhanced absorption of shock, reduced buckling upon pressure, increased rigidness, reduced twistability, lighter weight, and improved feel. The chassis 1504 can further contain openings and/or holes (not shown) substantially similar to the holes and/or openings described in relation with the clamshell smartphone (discussed above), wherein such holes allow the LEDs 1508 to be nestled within the chassis 1504. In other words, the LEDs 1508 are embedded into the chassis 1504 in respective holes associated therewith to allow the height of the LEDs 1508 to be absorbed (e.g., not added to the overall thickness of the device).

The thin smartphone 1500 includes a flex PCB 1502 including at least one dome switch 1506. As shown in the detail in an enlarged portion of the flex PCB 1502, the flex PCB 1502 can include an LED 1508 and a bent area 1510. The flex PCB 1502 can be bent in the bent area 1510 to provide a flush setting within the flex PCB 1502, wherein such flushness allows for a reduction in thickness due to the consolidation of the LED 1508 height within the flex PCB 1502. In an example, the flex PCB 1502 can be bent or cantilevered in the areas 1510 where the LEDs 1508 are mounted, such that the LED's are flush with the flex PCB 1502 reducing the thickness. In other words, the LEDs 1508 are nestled within the flex PCB 1502. In one technique to provide such cantilevered and/or bent area 1510, the flex PCB 1502 can be cut with three sides of a rectangle, wherein the flex PCB 1502 can be bent and/or cantilevered outward allowing the LED 1508 to sit in the recessed area (e.g., bent area 1510). It is to be appreciated that the chassis 1504 can be adjusted for the cantilever and/or bent area 1510. In other words, the chassis 1504 can have a substantially similar recess area that mirrors the recess in the bent area 1510.

Figure 16:
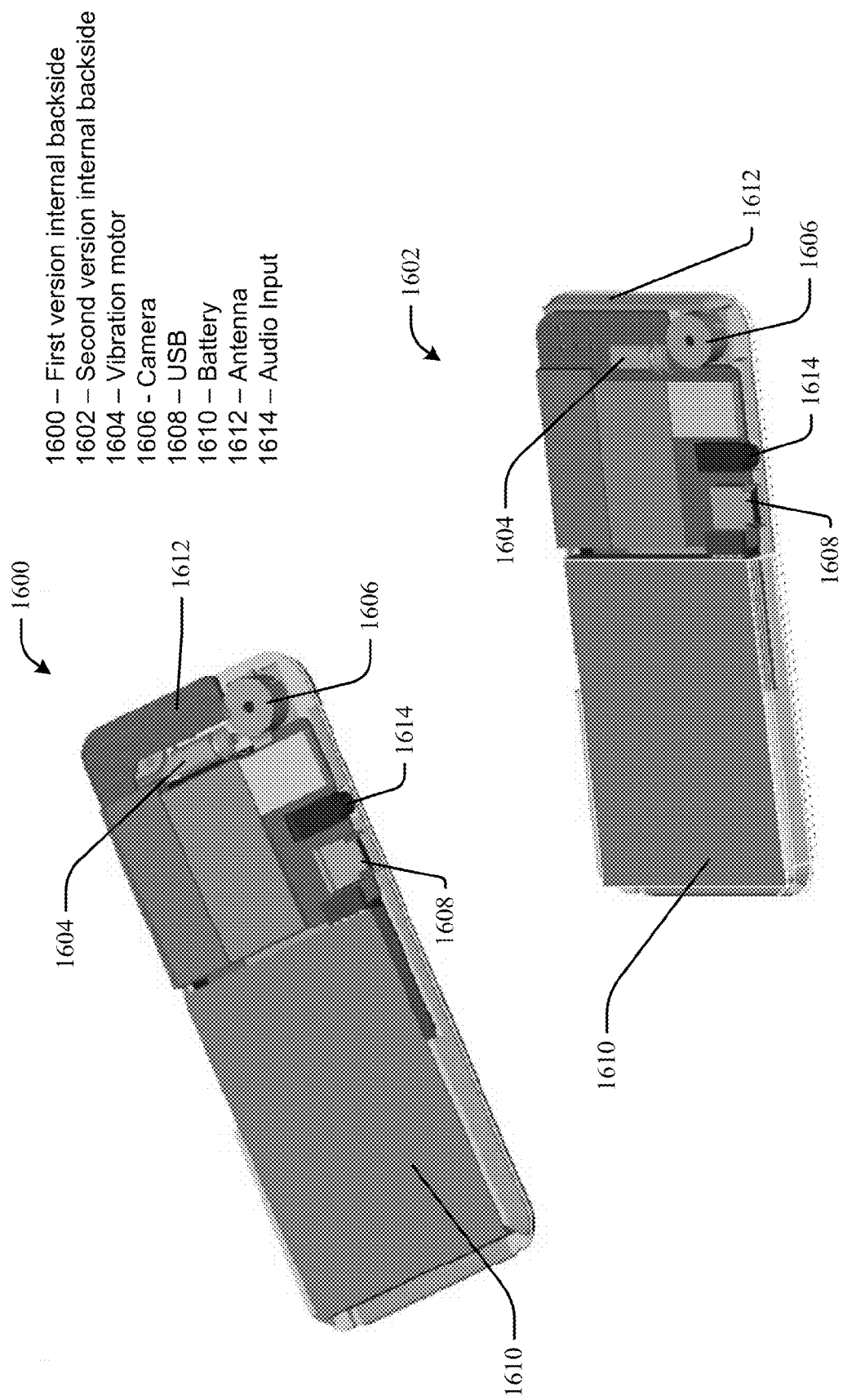
FIG. 16 illustrates an embodiment of a back panel of a thin smartphone.

Turning to FIG. 16, an embodiment of a back panel of a thin smartphone is illustrated. A first version 1600 of an internal exposure of a backside of a thin smartphone and a second version 1602 of an internal exposure of a backside of a thin smartphone can include at least one of the following: a vibration motor 1604, a camera 1606, a USB 1608, a battery 1610, and an audio input 1614. It is to be appreciated that the USB 1608, audio input 1614, and the battery 1610 can be substantially similar to the USB, audio input, and battery described in earlier figures.

In particular, the first version 1600 depicts an internal exposure of a backside of a thin smartphone in accordance with the claimed subject matter utilizing a specific antenna placement. The first version 1600 includes an internal antenna 1612 that can be integrated onto a PCB (not shown) associated to the thin smartphone. The novel implementation of integrating the internal antenna 1612 onto the PCB allows for compact, durable, and efficient assembly. In other words, the internal antenna 1612 can be part of the PCB to conserve thickness. In order to improve antenna performance, the area of which the internal antenna 1612 is placed includes a limited amount of components. In the second version 1602, an internal exposure of the backside of the thin smartphone is illustrated utilizing a disparate antenna placement. The second version 1602 places the internal antenna 1612 perpendicular to the PCB. It is to be appreciated and understood that the internal antenna 1612 can be placed in a substantially similar manner as the internal antenna in the messenger device and the clamshell smartphone, both described above.

It is to be appreciated that the PCB can have a top, a bottom, and a thickness, wherein the PCB has a bottom plane that can be perpendicular to the thickness of the PCB located at the bottom of the PCB. The internal antenna 1612 can be planar to the bottom plane of the PCB and the internal antenna 1612 can have a length that can be placed across the width of the PCB. In addition, the PCB can have a top plane that can be perpendicular to the thickness of the PCB located at the top of the PCB. The internal antenna 1612 can be planar to the top plane of the PCB and the internal antenna 1612 can have a length that can be placed across the width of the PCB.

IV. Mono Hinge

Figure 17:
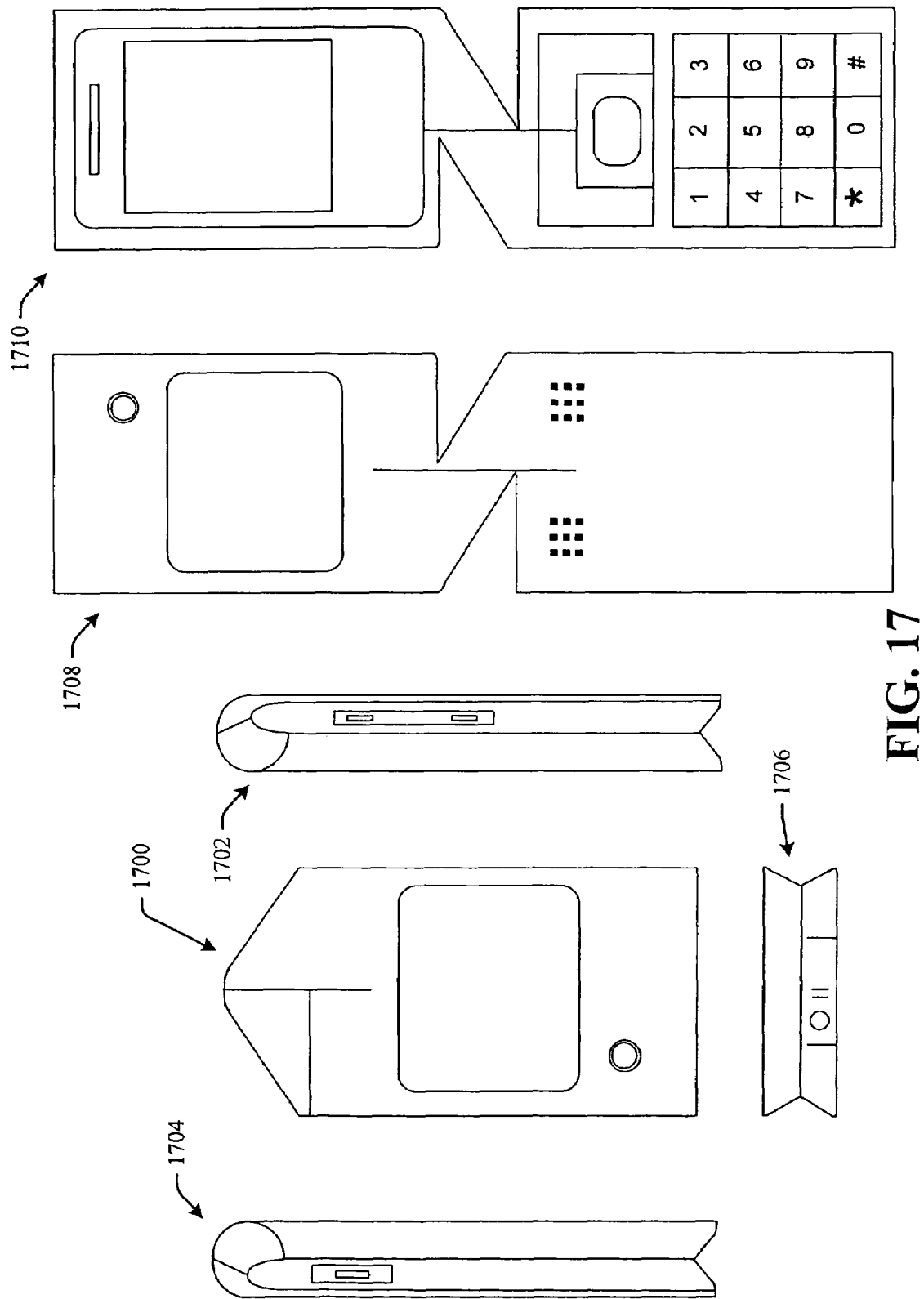
FIG. 17 illustrates an embodiment of a closed clamshell smartphone with a mono hinge in various positions viewed from a plurality of angles.

FIG. 17 illustrates an embodiment of a closed clamshell smartphone with a mono hinge in various positions viewed from a plurality of angles. A mono hinge is illustrated in a clamshell smartphone, wherein the mono hinge is a single hinge that allows at least a partially circular movement about an axis while providing electrical connectivity via a channel within said mono hinge. In other words, the mono hinge is a single hinge that provides physical and electrical connectivity to an upper portion and a lower portion associated with the clamshell smartphone and/or any suitable device containing an upper portion and a lower portion that utilizes at least a partially circular movement about an axis.

A front view 1700 of the clamshell smartphone is depicted, wherein the mobile communication device is in a closed position. A right side view 1702, a left side view 1704, and a bottom view 1706 illustrate the various characteristics of the clamshell smartphone having the mono hinge, wherein the clamshell smartphone is in a closed position. In a closed position, the clamshell smartphone is illustrated in a front view 1710 and a rear view 1708. It is to be appreciated that the clamshell smartphone in FIG. 17 is an example and the claimed subject matter is not limited to the configurations, characteristics, dimensions, etc. as illustrated.

Figure 18:
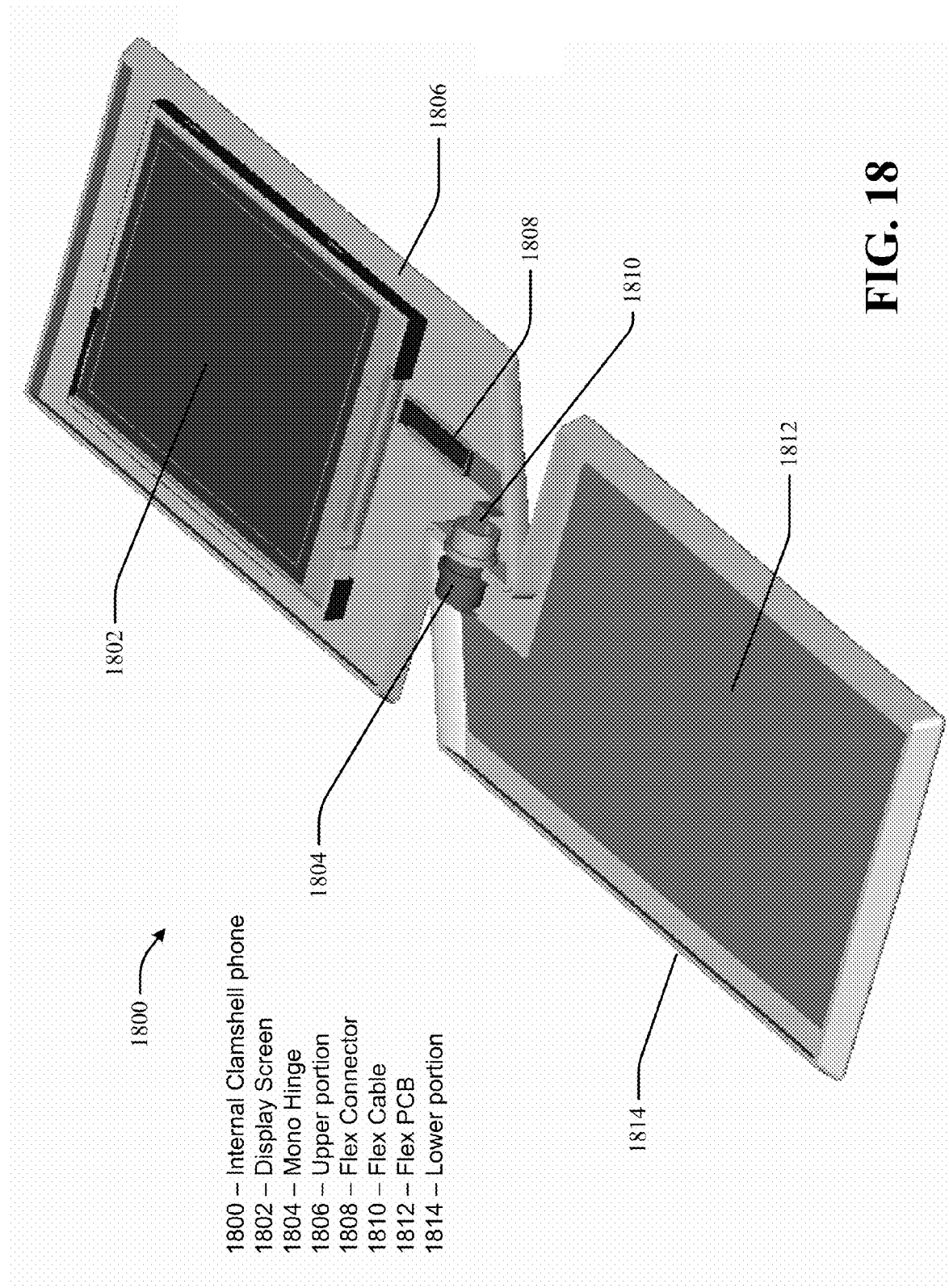
FIG. 18 illustrates an embodiment of a mono hinge integrated into a clamshell communication device in accordance with an aspect of the subject innovation.

FIG. 18 illustrates an embodiment of a mono hinge integrated into a clamshell communication device in accordance with an aspect of the subject innovation. It is to be appreciated that the mono hinge can be implemented in a clamshell smartphone, a messenger device, and/or any device that includes an upper portion and a lower portion that utilizes a partially circular movement about an axis. An internal view of a clamshell communication device 1800 demonstrates a mono hinge 1804 that provides connectivity (e.g., electrical and physical) between an upper portion 1806 and a lower portion 1814. The upper portion 1806 can include a display screen 1802 to allow various graphical items to be displayed. For instance, the display screen 1802 can display numbers, letters, pictures, video, calendars, web pages, maps, any suitable data related to the clamshell communication device 1800, etc. to a user. The lower portion 1814 can include a flex PCB 1812. A flex cable 1810 can provide electrical connectivity between the upper portion 1806 and the lower portion 1814, wherein the flex cable 1810 can be located within an aperture associated with the mono hinge 1804. Moreover, the mono hinge 1804 can utilize a flex connector 1808.

Figure 19:
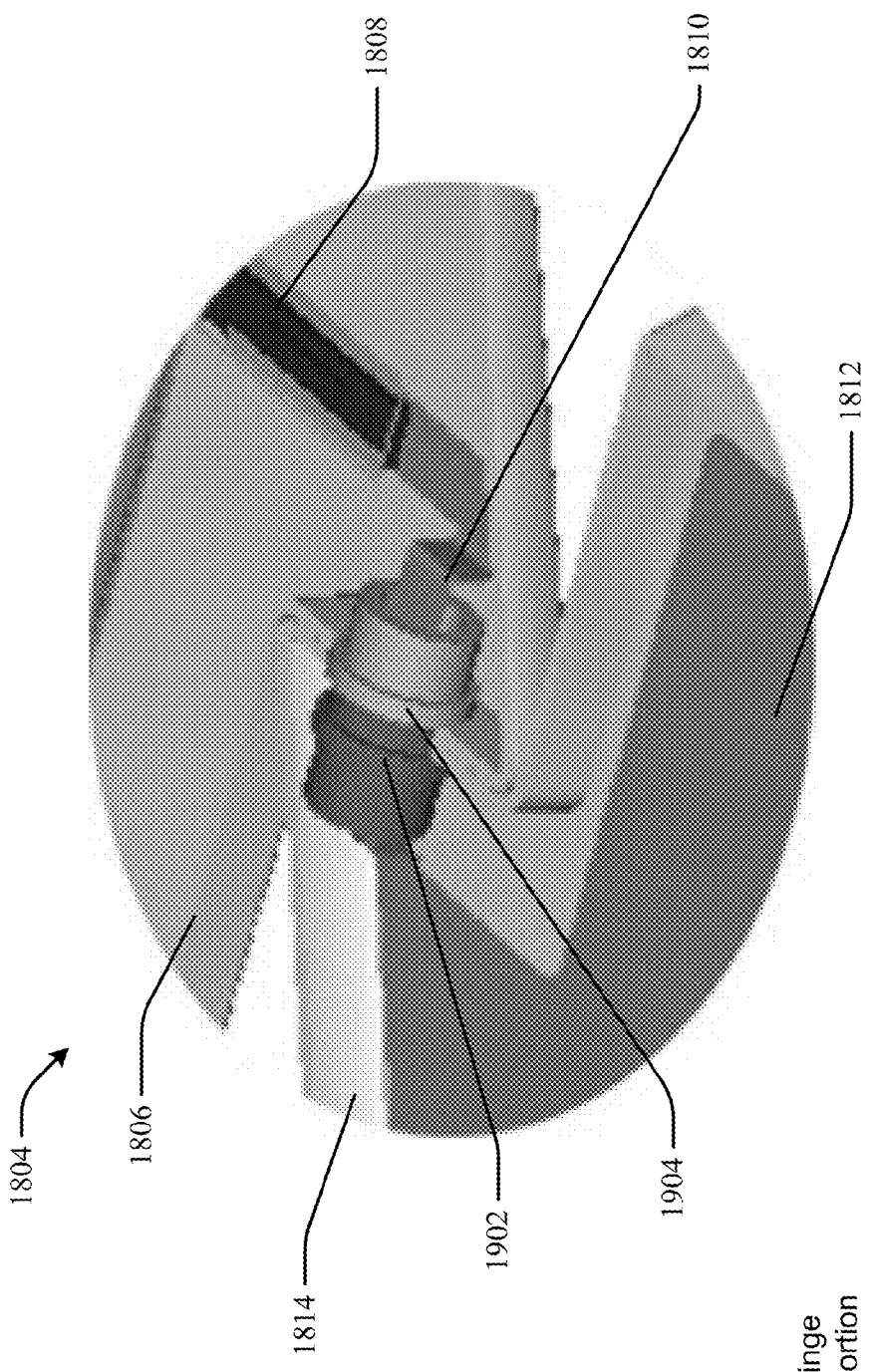
FIG. 19 illustrates an enlarged view of a mono hinge utilized within a communication device.
Figure 20:
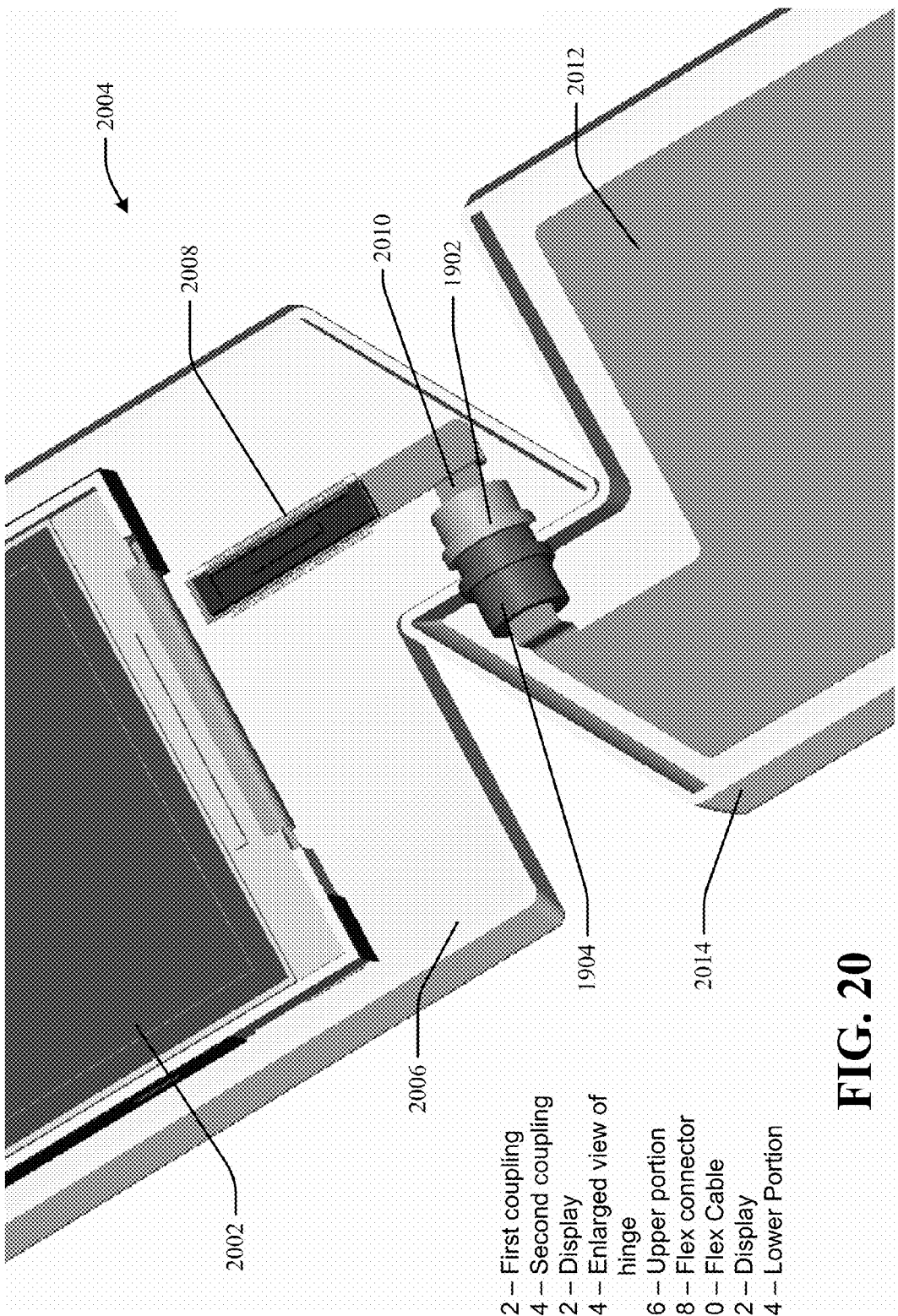
FIG. 20 illustrates an embodiment of a mono hinge integrated into a clamshell communication device in accordance with an aspect of the subject innovation.

FIG. 19 illustrates an enlarged view of a mono hinge utilized within a communication device. The enlarged portion of the mono hinge 1804 can connect the upper portion 1806 and the lower portion 1814, wherein such connection can provide physical connectivity and electrical connectivity. The mono hinge can include a first coupling 1902 and a second coupling 1904, wherein an aperture can exist within said couplings. The aperture can allow the flex cable 1810 and the connector 1808 to run through the aperture. The mono hinge 1804 can be made from, for instance, stainless steel, magnesium, and/or any suitable material. Moreover, the mono hinge 1804 can provide structural strength to hold the upper portion 1806 and the lower portion 1814 together. The mono hinge 1804 can contain a spring (not shown) to provide torque to keep the device open, closed, to a desired position, and/or any position within the partially circular motion about an axis associated with the mono hinge 1804 (e.g., to approximately 180 degrees or whatever angle maximizes the utility of the device). For example, the spring can be made out of metal and/or any other suitable material to provide adequate torque.

FIG. 19 illustrates an embodiment of a mono hinge integrated into a clamshell communication device which includes the components described above in FIGS. 18 and 19.

FIGS. 21-24 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 21:
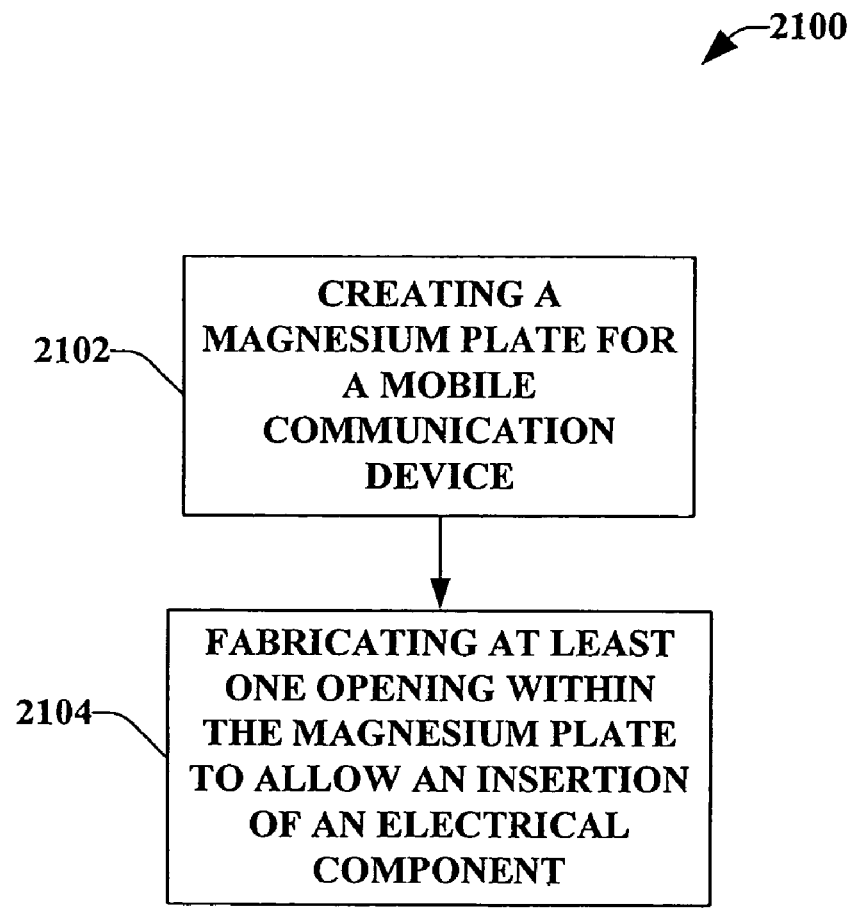
FIG. 21 illustrates a methodology that facilitates fabricating a plate for a mobile communication device.

FIG. 21 illustrates a methodology 2100 that facilitates fabricating a plate for a mobile communication device. At reference numeral 2102, a magnesium plate can be created for a mobile communication device. The mobile communication device can be, but is not limited to, a clamshell smartphone, a messenger device, a thin smartphone, a mobile phone, a portable digital assistant (PDA), and/or any other suitable communication device. The plate made out of magnesium can provide enhanced performance in comparison to conventional materials. For example, the plate constructed from magnesium provides at least the following benefits in comparison to conventional plastics and/or materials for communication devices: enhanced absorption of shock, reduced buckling upon pressure, increased rigidness, reduced twistability, lighter weight, and improved feel. In addition, the plate can protect a PCB (e.g., associated with the mobile communication device) from pressure induced by pressing keys associated with, for instance, a keypad related to the mobile communication device.

At reference numeral 2104, at least one opening within the magnesium plate can be fabricated to allow an insertion of an electrical component associated with the PCB and/or the mobile communication device. It is to be appreciated that the electrical component can be, but is not limited to, an LED, a dome switch, and a plunger switch. The openings within the magnesium plate can be tailored to the specific electrical component to allow the reduction of thickness of the mobile communication device. For instance, the plate may include a set of holes (e.g., a set of openings) for a switch plunger on a rubber plunger sheet and a set of holes (e.g., a set of openings) for at least one light emitting diode (LED). When assembled, the set of holes for the switch plungers align with the dome switches of the PCB and the set of holes for the LEDs align with the LEDs located on the PCB. The set of holes for the switch plungers allow the plungers to activate the dome switches on the PCB when pressure is exerted on the keypad. In other words, the electrical component can be embedded into the case (e.g., within the holes) allowing the electrical component to sit within the mobile communication device without increasing the overall thickness. Traditionally, electrical components are not placed through specifically tailored holes and the entire height of the electrical component is added to the overall thickness of the communication device.

Figure 22:
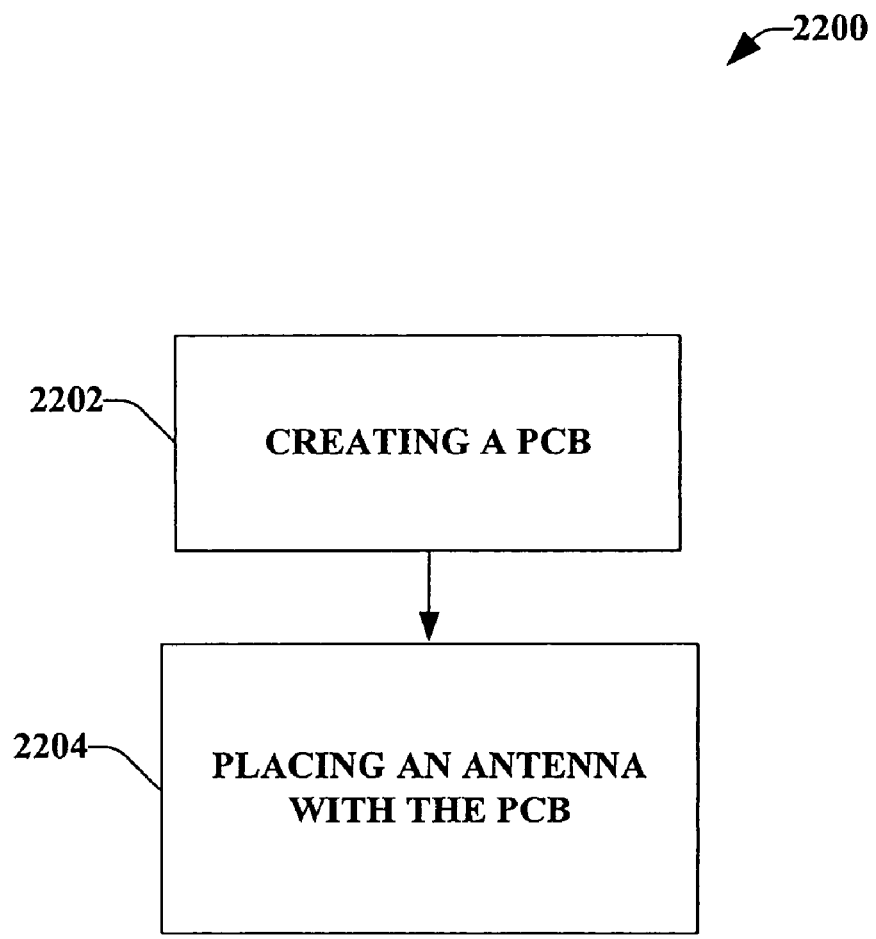
FIG. 22 illustrates a methodology related to placing an antenna in an optimal position in a mobile communication device.

FIG. 22 illustrates a methodology 2200 related to placing an antenna in an optimal position in a mobile communication device. At reference numeral 2202, a printed circuit board (PCB) can be created for a mobile communication device. The mobile communication device can be at least one of a clamshell smartphone, a messenger device, a thin smartphone, a mobile phone, a portable digital assistant (PDA), and/or any other suitable communication device.

At reference numeral 2204, an antenna is optimally positioned in relation to the PCB. It is to be appreciated that the PCB on which the antenna is positioned can have a top, a bottom, and a thickness, wherein the PCB has a bottom plane that can be perpendicular to the thickness of the PCB located at the bottom of the PCB. The antenna can be planar to the bottom plane of the PCB and the antenna can have a length that can be placed across the width of the PCB. In addition, the PCB can have a top plane that can be perpendicular to the thickness of the PCB located at the top of the PCB. The antenna can be planar to the top plane of the PCB and the antenna can have a length that can be placed across the width of the PCB. In another novel antenna position, the antenna can be integrated onto the PCB associated with the mobile communication device. In other words, the antenna can be part of the PCB to conserve thickness.

Figure 23:
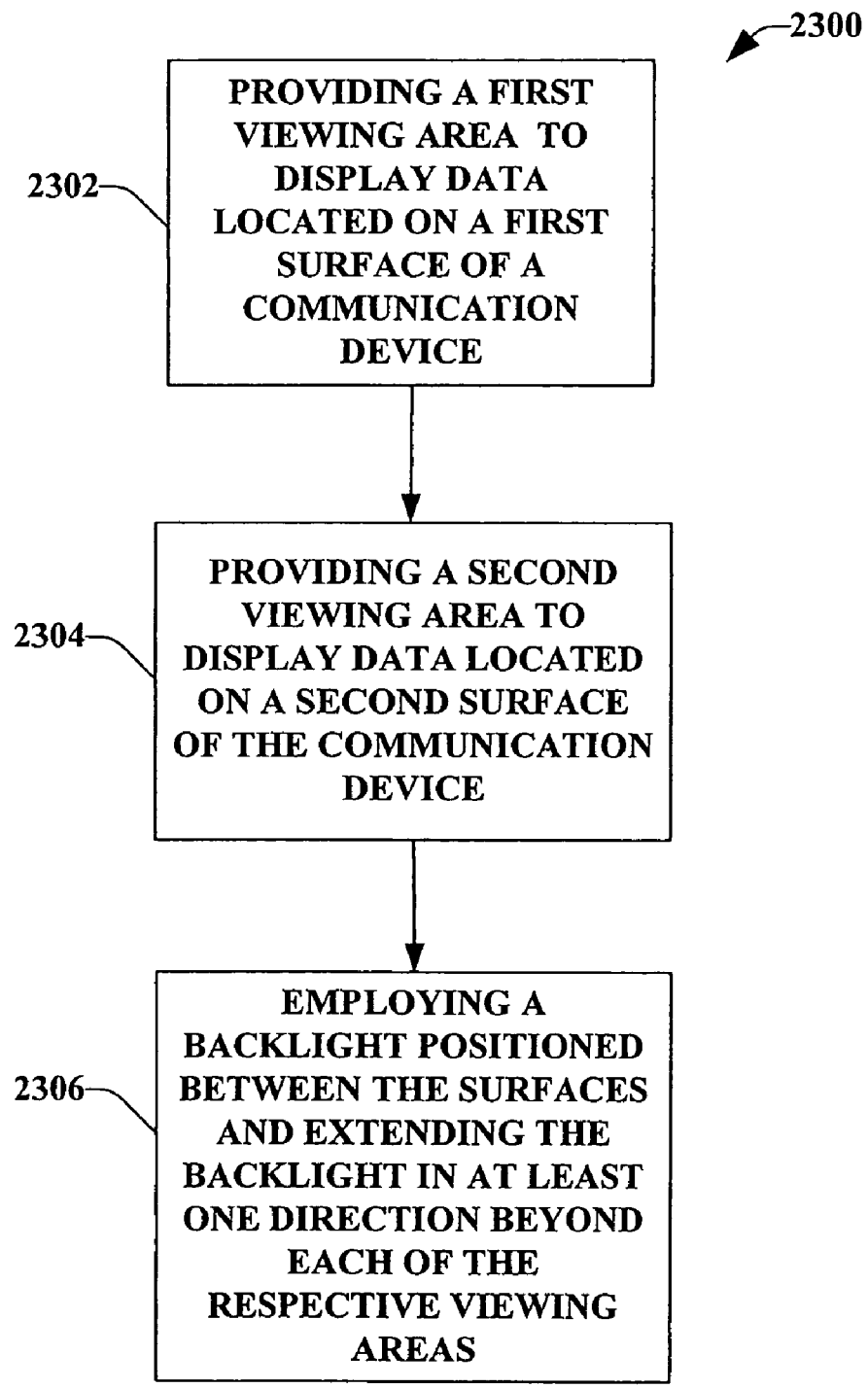
FIG. 23 illustrates a methodology for creating a dual display for a communication device in accordance with an aspect of the subject innovation.

FIG. 23 illustrates a methodology 2300 for creating a dual display for a communication device in accordance with an aspect of the subject innovation. At reference numeral 2302, a first viewing area to display data can be provided on a first surface of a communication device. It is to be appreciated that the communication device can be, but is not limited to, a clamshell smartphone, a messenger device, a thin smartphone, a mobile phone, a portable digital assistant (PDA), and/or any other suitable communication device that can utilize a dual display. At reference numeral 2304, a second viewing area to display data can be provided on a second surface opposite of the first surface on the communication device. In other words, the first viewing area and the second viewing area can be a dual display, wherein data is displayed to a user in a first direction (e.g., X, Y, Z, etc.) by the first viewing area and in a second direction (e.g., $-X$, $-Y$, $-Z$, etc.) that is opposite by the second viewing area.

At reference numeral 2306, a backlight can be positioned between the first surface and the second surface and extended in at least one direction beyond each of the respective viewing areas. It is to be appreciated that the backlight can be utilized by both the first viewing area (e.g., a main display such as LCD, flat-panel, etc.) and the second viewing area (e.g., a secondary display such as LCD, flat-panel, etc.), wherein the backlight is extended beyond the active area of the first viewing area into an area that is not utilized by one of the first viewing area and the second viewing area. Based at least in part upon the extension of the backlight into the area, the first viewing area can be large and also allow for a large area for a keypad. It is to be appreciated and understood that the extension of the backlight can be toward any suitable area not covered by at least one viewing area to provide the capability of sharing the backlight between the viewing areas. For instance, the extension can be on the opposite side of the active area, below the active area, above the active area, etc. By utilizing the technique of extending the backlight into the area, any external display area (e.g., main display) can be offset allowing space for keypad, data input pad, etc.

Figure 24:
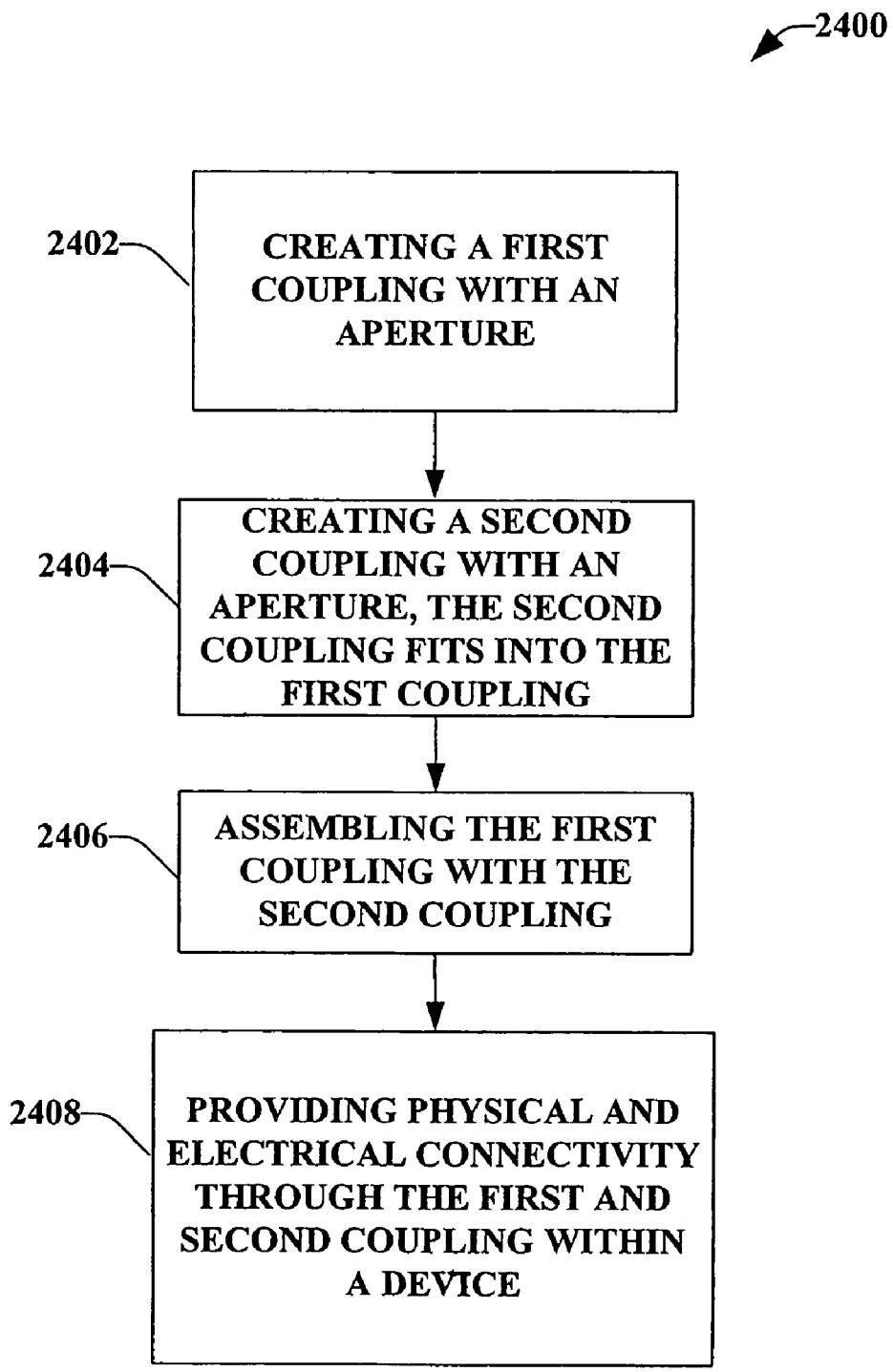
FIG. 24 illustrates a methodology that facilitates creating a connecting mechanism in accordance with the claimed subject matter.

FIG. 24 illustrates a methodology 2400 that facilitates creating a connecting mechanism in accordance with the claimed subject matter. At reference numeral 2402, a first coupling with an aperture can be created. At reference numeral 2404, a second coupling with an aperture can be created, wherein the second coupling can fit into the first coupling and/or the first coupling can fit into the second coupling. In other words, the first coupling and the second coupling can utilize a mating connectivity (e.g., a male connection, a female connection, etc.).

At reference numeral 2406, the first coupling and the second coupling can be assembled together to create a mono hinge. The mono hinge can be utilized in any device that includes an upper portion and a lower portion, wherein the upper portion and/or the lower portion can move in a partially circular motion about an axis associated with the mono hinge. For example, the device can be a clamshell smartphone, a messenger device, a PDA, and/or, any other suitable device.

At reference numeral 2408, a physical and/or electrical connectivity can be provided through the first and second coupling within the device. The apertures can allow a flex cable and a connector to run through the apertures to provide electrical connectivity between the upper portion and the lower portion. To provide strength, the mono hinge can be made from, for instance, stainless steel, magnesium, and/or any suitable material. The mono hinge can provide structural strength to hold the upper portion and the lower portion together. The mono hinge can further contain a spring (not shown) to provide torque to keep the device open, closed, to a desired position, and/or any position within the partially circular motion about an axis associated with the mono hinge (e.g., to approximately 180 degrees or whatever angle maximizes the utility of the device).

What has been described above includes examples of embodiments of communication devices. It is, of course, not possible to describe every conceivable combination of components or methodologies, but one of ordinary skill in the art may recognize that many further combinations and permutations are possible. Accordingly, the embodiments are intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary embodiments. In this regard, it will also be recognized that the embodiments include a system as well as a computer-readable medium having computer-executable instructions for performing the acts and/or events of the various methods.

In addition, while a particular feature of the embodiments may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A messenger device, comprising:
a lower portion of the messenger device comprising:
a keypad;
a battery;
a magnesium plate that supports the keypad and a printed circuit board (PCB), wherein the magnesium plate defines a pocket for containing at least a portion of the battery;
an upper portion of the messenger device comprising:
a dual display including a main display on a first surface and a secondary display on a second surface opposite of the first surface; and
a backlight positioned between the surfaces that is shared between the main display and the secondary display and is extended in at least one direction beyond each of the displays toward an area not covered by at least one of the displays;
a dome switch on the PCB that is proximate to and that extends into an opening on the plate; and
a switch plunger associated with the keypad, wherein the opening allows the plunger to activate the dome switch.

2. The messenger of device of claim 1, the extended backlight is an electro-luminescent (EL) backlight.

3. The messenger of device of claim 1, the first surface and the second surface are the same size.

4. The messenger of device of claim 3, the main display has a first size and the secondary display has a second size, the first size and the second size are disparate.

5. The messenger device of claim 1, the PCB has a top, a bottom, and a thickness.

6. The messenger device of claim 5, the PCB has a bottom plane that is perpendicular to the thickness of the PCB located at the bottom of the PCB.

7. The messenger device of claim 6, an internal antenna is planar to the bottom plane of the PCB.

8. The messenger device of claim 7, the internal antenna has a length that is placed across the width of the PCB.

9. The messenger device of claim 5, the PCB has a top plane that is perpendicular to the thickness of the PCB located at the top of the PCB.

10. The messenger device of claim 9, an internal antenna is planar to the top plane of the PCB.

11. The messenger device of claim 10, the internal antenna has a length that is placed across the width of the PCB.

12. A method of assembly for a messenger device, comprising:
providing a first viewing area to display data located on a first surface of a communication device;
providing a second viewing area to display data located on a second surface opposite of the first surface on the communication device providing a dual display;
providing, in a lower portion of the messenger device, a keypad, a battery, and a magnesium plate that supports the keypad and a printed circuit board (PCB), wherein the magnesium plate defines a pocket for containing at least a portion of the battery;
providing a dome switch on the PCB that is proximate to and that extends into an opening on the plate;
providing a switch plunger associated with the keypad, wherein the opening allows the plunger to activate the dome switch; and
employing an electro-luminescent (EL) backlight positioned between the surfaces and extending the backlight in at least one direction beyond each of the displays toward an area not covered by at least one of the displays.

13. The method of claim 12, further comprising:
creating a magnesium plate for the messenger device; and
fabricating at least one opening within the magnesium plate for an electrical component.

14. The method of claim 13, the electrical component is at least one of an LED, a dome switch, and a plunger switch.

15. An assembled case for a messenger device, comprising:
a lower portion that includes a keypad, a magnesium plate that supports the keypad and a PCB, a back cover, and a battery, wherein the magnesium plate defines a pocket for contain at least a portion of the battery;
an upper portion that includes a lens, a front case, a keypad, a dual display, a PCB, an inner plate, and an inner lens; and
the dual display includes a main display on a first surface and a secondary display on a second surface opposite of the first surface;
an electro-luminescent (EL) backlight positioned between the surfaces that is shared between the main display and the secondary display and is extended in at least one direction beyond each of the displays toward an area not covered by at least one of the displays;
a dome switch on the PCB that is proximate to and that extends into an opening on the plate; and
a switch plunger associated with the keypad, wherein the opening allows the plunger to activate the dome switch.

* * * * *